US010455013B2

(12) United States Patent
Liu

(10) Patent No.: US 10,455,013 B2
(45) Date of Patent: Oct. 22, 2019

(54) PEER-TO-PEER UPLOAD SCHEDULING

(71) Applicant: TENCENT TECHNOLOGY (SHENZHEN) COMPANY LIMITED, Shenzhen (CN)

(72) Inventor: Gang Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 620 days.

(21) Appl. No.: 15/130,431

(22) Filed: Apr. 15, 2016

(65) Prior Publication Data

US 2016/0234303 A1 Aug. 11, 2016

Related U.S. Application Data

(63) Continuation of application No. PCT/CN2014/088374, filed on Oct. 11, 2014.

(30) Foreign Application Priority Data

Oct. 18, 2013 (CN) .......................... 2013 1 0495159

(51) Int. Cl.
*H04L 29/08* (2006.01)
*H04L 29/06* (2006.01)

(52) U.S. Cl.
CPC ........ *H04L 67/1085* (2013.01); *H04L 67/104* (2013.01); *H04L 67/42* (2013.01); *H04L 67/303* (2013.01)

(58) Field of Classification Search
CPC ... H04L 67/1085; H04L 67/42; H04L 67/104; H04L 67/303
See application file for complete search history.

(56) References Cited

U.S. PATENT DOCUMENTS 7,895,311 B1 * 2/2011 Juenger .................. G06F 21/10
709/223
8,838,830 B2 * 9/2014 Igelka .................. G06F 9/5083
370/255
(Continued)

FOREIGN PATENT DOCUMENTS

CN 101800621 A 8/2010
CN 102164157 A 8/2011
(Continued)

OTHER PUBLICATIONS

International Preliminary Report for Application No. PCT/CN2014/088374, dated Apr. 19, 2016.
(Continued)

*Primary Examiner* — Kevin T Bates
*Assistant Examiner* — Ronak Patel
(74) *Attorney, Agent, or Firm* — Brinks Gilson & Lione

(57) ABSTRACT

Client devices act as data sources for other clients, such as in a P2P or P2SP situation. The client devices receive upload configuration information based on information relating to their prior uploads and upload operation. Uploads are provided to other client devices according to the upload configuration information. The client devices adjust an upload configuration based on the received upload configuration information. For example, the client devices adjust an upload bandwidth, an upload speed limit, or blocking/non-blocking status for upload channels.

17 Claims, 14 Drawing Sheets

(56) References Cited

U.S. PATENT DOCUMENTS

| | | | |
|---|---|---|---|
| 9,008,673 B1* | 4/2015 | Sanjeev | H04L 43/16 370/229 |
| 9,660,922 B2* | 5/2017 | Ramakrishnan | H04L 47/25 |
| 9,729,557 B1* | 8/2017 | Sanyal | H04L 67/22 |
| 2008/0005336 A1 | 1/2008 | Cohen et al. | |
| 2009/0177772 A1* | 7/2009 | Guan | H04L 61/1582 709/224 |
| 2009/0177792 A1* | 7/2009 | Guo | H04N 7/17336 709/231 |
| 2010/0131671 A1* | 5/2010 | Kohli | H04L 65/60 709/233 |
| 2011/0071841 A1 | 3/2011 | Fomenko et al. | |
| 2011/0125849 A1 | 5/2011 | Boyd et al. | |
| 2011/0161476 A1 | 6/2011 | Wolff-Peterson | |
| 2011/0277009 A1* | 11/2011 | Damola | H04N 7/165 725/116 |
| 2011/0321072 A1* | 12/2011 | Patterson | H04N 21/44222 725/5 |
| 2012/0184374 A1 | 7/2012 | Rupert | |
| 2015/0058420 A1* | 2/2015 | Rouibia | H04L 67/1063 709/204 |

FOREIGN PATENT DOCUMENTS

| | | |
|---|---|---|
| CN | 102752370 A | 10/2012 |
| CN | 102868566 A | 1/2013 |
| CN | 103312824 A | 9/2013 |
| WO | 2009101443 A2 | 8/2009 |
| WO | 2012158161 A1 | 11/2012 |

OTHER PUBLICATIONS

International Search Report for Application No. PCT/CN2014/088374, dated Jan. 9, 2015.

Chinese Office Action for Application No. 2013104951590 dated Jul. 28, 2017, and an English concise explanation of relevance thereof.

* cited by examiner

PEER-TO-PEER UPLOAD SCHEDULING

CROSS-REFERENCE TO RELATED APPLICATIONS

This application is a continuation of International Application No. PCT/CN2014/088374, filed on Oct. 11, 2014. This application claims the benefit and priority of Chinese Application No. 201310495159.0, filed on Oct. 18, 2013. The entire disclosures of each of the above applications are incorporated herein by reference.

FIELD

The present disclosure relates to the field of Internet-based uploads and to upload scheduling.

BACKGROUND

This section provides background information related to the present disclosure which is not necessarily prior art.

The development of technologies related to the Internet has enabled a large amount of data including, for example, images, audio and video files, software, and video games, to be downloaded and utilized by Internet users. However, the growing number of users downloading data, which may be available from multiple sources, may cause network congestion and various other issues, which deteriorate the user's experience.

Peer-to-Peer (P2P) technology, also known as "peer to peer" technology, is an approach with which a client also acts as a data source and uploads resources to other clients. In such an approach, the upload speed depends on the computational capability and the bandwidth of the participating clients. Peer-to-Server & Peer (P2SP) technology is based on a client-to-server and client mechanism. It not only supports P2P technology, but it also integrates server resources and P2P resources through a retrieval database. When the user downloads a file, data sources for the file are divided into an original link, P2P network and an auxiliary source of a third party image. The system may search other sources and selects appropriate sources for acceleration.

With the development of the Internet, P2P and P2SP technologies have been widely used in applications pertaining to file upload and download. Due to clients acting as both a data source and a terminal, many software applications of P2P or P2SP technologies occupy immense bandwidth and cause considerable data traffic in the network. As a result, the local area network, as well as part of the wide area network, can be congested, and thus, the service quality can be degraded.

A serious influence of P2P or P2SP technology on the network occurs when using substantial network bandwidth, which may easily cause heavier network load, packet loss, etc., and, in return, influence P2P or P2SP transmission efficiency. The download speed on one end (e.g., a client) of a P2P software application is closely related to the upload speed on the other end (e.g., another client). In an asynchronous digital user line loop, the uplink bandwidth and the downlink bandwidth are asymmetric and the uplink bandwidth is significantly less than the downlink bandwidth. When upload is at full load, the download speed will change to 40% of the maximum speed. Therefore, if the P2P application does not limit the upload speed, the download speed of the client will become low and the Internet speed (e.g., download speed) of other network software applications running on the client terminal will also be influenced. Therefore, clients may choose to close P2P application in the absence of download tasks, or limit the upload speed of P2P application.

However, as specified in TCP/IP, each data message should have confirmation feedback. That is, after data transmission, for each data message, a confirmation reply of receiving the data message should be sent back. Accordingly, a subsequent transmission speed is determined and whether there is a loss of data message and whether the lost data should be transmitted again are also determined. Part of the uplink bandwidth is used for transmitting the confirmation data.

If the client severely limits the upload speed, the uplink load will be too heavy, the feedback speed of the confirmation data will be reduced, and the download speed will then also be reduced. In the asymmetric digital loop where uplink bandwidth is much less than the download bandwidth, the influence is especially significant.

SUMMARY

This section provides a general summary of the disclosure, and is not a comprehensive disclosure of its full scope or all of its features.

In one aspect, client devices act as data sources for other clients, such as in a P2P or P2SP situation. The client devices receive upload configuration information based on information relating to their prior uploads and upload operation. Uploads are provided to other client devices according to the upload configuration information.

One aspect includes a computer-implemented method for determining upload configuration for a client acting as a peer-to-peer source of data. An upload scheduling system receives client information relating to uploads from the client. It determines upload configuration information based on the client information, and provides the determined upload configuration information to the client. Uploads from the client are then provided according to the upload configuration information.

The client information may include local configuration information, network node information, and/or bandwidth information. Local configuration information describes the client's configuration for providing uploads. Examples include an upload speed limit for uploads from the client and blocking/non-blocking information that determines a number of upload channels from the client to other clients. Network node information describes the connections of the client as a network node. Bandwidth information might describe upload and/or download bandwidth of the client.

The upload configuration information may include instructions to implement an upload scheduling strategy and/or information from which the client can derive instructions. It may also include updates to the local configuration information. Examples include upload speed limits and blocking/non-blocking of network communication channels to other clients.

Another aspect relates to measuring bandwidth of the client. In one approach, the client sends to a server a bandwidth detection request for detecting an upload or download bandwidth of the client. In response, the server determines a set of Uniform Resource Locators (URLs) for use in detecting the upload and/or download bandwidth for the client and sends the URLs to the client. The client uses the URLs to run bandwidth tests.

The features and benefits described in the specification are not all inclusive and, in particular, many additional features and benefits will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The Figures (FIGS.) and the following description describe the various embodiments by way of illustration. One skilled in the art will readily recognize from the following description that alternative embodiments of the structures and methods illustrated herein may be employed without departing from the principles described herein.

Reference will now be made in detail to several embodiments, examples of which are illustrated in the accompanying figures. It is noted that wherever practicable similar or like reference numbers may be used in the figures to indicate similar or like functionality.

FIGS. 1-5 show devices and modules according to various aspects of the disclosure. FIGS. 6-13 show processes according to various aspects of the disclosure. The description in FIGS. 1, 2, 6, and 7 are at a higher system level. FIGS. 3-5 and 8-13 describe components according to different embodiments.

Figure 1:
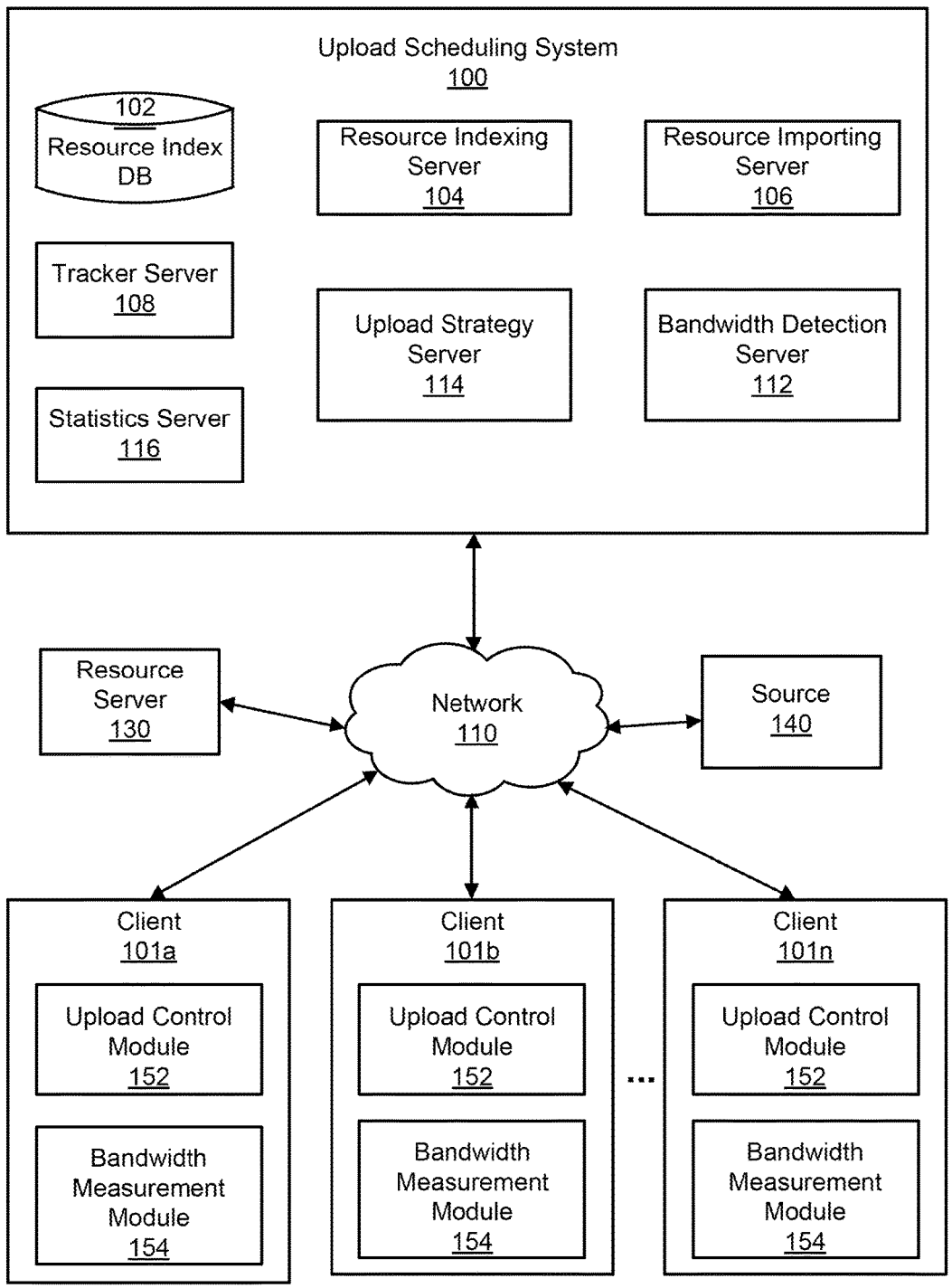
FIG. 1 is a block diagram of a computing environment for supporting upload scheduling and bandwidth detection according to various embodiments.

Referring to FIG. 1, a computing environment for supporting upload scheduling and/or bandwidth detection in a P2P or P2SP network is shown according to various embodiments of the present disclosure. The computing environment includes an upload scheduling system 100, client devices 101*a*-101*n*, a resource server 130, and additional sources 140 connected by a network 110. One upload scheduling system 100, three client devices 101, one resource server 130, and one additional source 140 are shown in FIG. 1 in order to simplify and clarify the description. Various embodiments of the computing environment can have many of each of these elements. Likewise, the functions performed by the various entities of FIG. 1 may differ in different embodiments.

A client device 101 is an electronic device used by a user to perform functions such as uploading and downloading digital data (i.e., network resources) and consuming the downloaded resources, for example, including watching videos, executing software applications, and viewing content downloaded from websites hosted by web servers on the network 110. Data to be downloaded to the client device 101 may be available from multiple sources, including peer-to-peer sources (e.g., other clients 101) and other sources 140. Examples of other sources 140 include Content Delivery Network (CDN) services. In a peer-to-peer aspect, the client device 101 can function as a network node in a P2P or P2SP system to upload digital data to servers or to other client devices 101. In such a case, the client device 101 acts as a source (or server) of the network resources. Based on information reported by the client device 101 relating to uploads from the client device 101, the upload scheduling system 100 determines upload configuration information for implementing an upload scheduling strategy for the client device 101 in order to make uploads from the client device 101 with higher efficiency and higher quality.

The client device 101 may be a dedicated video player, a smart phone, a tablet, notebook, or desktop computer. According to various embodiments of the present disclosure, the client device 101 includes and/or interfaces with a display device on which the user may view the video files and other digital content. In addition, the client device 101 provides a user interface (UI), such as physical and/or on-screen buttons, with which the user may interact with the client device 101 to perform functions such as downloading/uploading samples of digital data, consuming digital data, selecting digital data, and purchasing digital data.

The upload scheduling system 100 receives client information, such as information related to downloads, uploads, and network connection of the client, and uses the client information to determine upload configuration information for the client device 101. Uploads from the client device 101 are then provided according to the upload configuration information.

According to various embodiments of the present disclosure, the upload scheduling system 100 receives a request for upload scheduling from the client device 101. For example, when the client device 101 sends a request for network resources to a source or a peer (e.g., a server, another client device 101), the client device 101 may want to determine its best upload configuration since once the client device 101 starts downloading network resources from the source, other peers (e.g., other client devices 101) in the network can also request the network resources from the client device 101. According to various embodiments of the present disclosure, the upload scheduling system 100 receives the client information from the client device 101 periodically and pushes the determined upload configuration to the client device 101 responsive to receiving the client information. Additionally, the upload scheduling system 100 may also handle upload or download bandwidth detection for the client devices 101.

Figure 6:
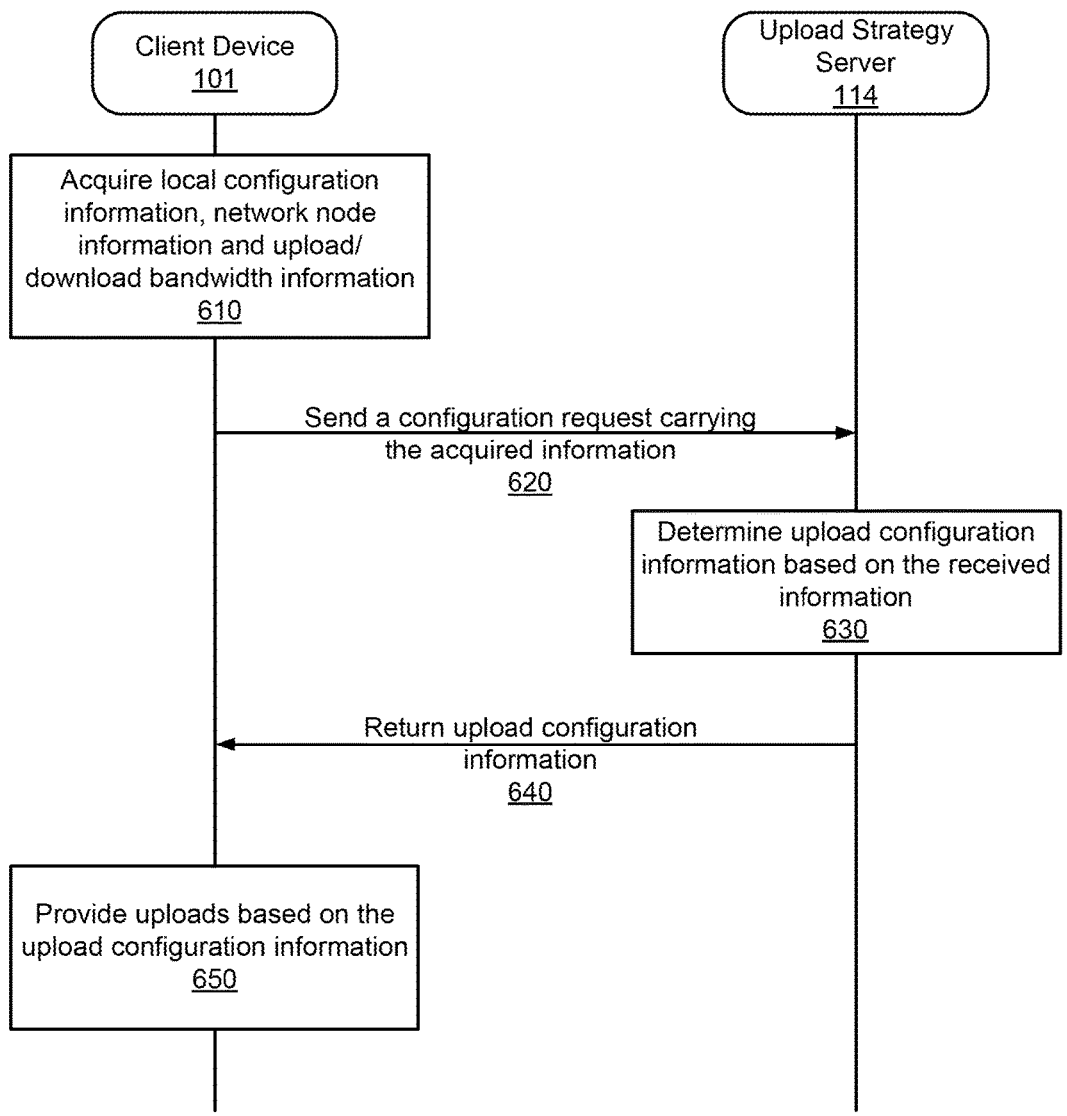
FIG. 6 is a flowchart illustrating a communication process for configuring upload of a client based on according to various embodiments.

Referring to FIG. 6, a flowchart illustrating a communication process for determining upload configuration for a client device 101 is illustrated. In the illustrated embodiment, the communication process is conducted by the client device 101 and the upload strategy server 114 (which is a component of the upload scheduling system and is described in greater detail below). The client device 101 acquires 610 information about itself and its uploads (referred to as client information). This client information may include local configuration information, network node information, and bandwidth information. Local configuration information describes the client's configuration for providing uploads. Examples for local configuration information may include an upload speed limit for each upload from the client device 101 and blocking/non-blocking information that determines a number of upload channels from the client device 101 to other client devices 101. Network node information describes the connections of the client device 101 as a network node in a P2P or P2SP system. Bandwidth information might describe upload and/or download bandwidth of the client device 101.

In this example, the client device 101 sends 620 a configuration request to an upload strategy server 114; where the configuration request carries the acquired client information (e.g., local configuration information, network node information, and/or bandwidth information) to the upload strategy server 114. The upload strategy server 114 determines 630 upload configuration information based on the received client information. It then sends 640 the upload configuration information to the client device 101 to communicate an upload scheduling strategy to the client device 101. Uploads from the client device 101 are then provided 650 according to this upload configuration information. The upload configuration information may include an update of the local configuration information. In a particular example, the client device 101 regulates the upload bandwidth and blocking/non-blocking of network communication channels to other client devices 101, according to the received upload configuration information.

By repeating the process shown in FIG. 6, the upload scheduling of the client device 101 is no longer constant. It can adapt to the changing environment and demands to complete upload tasks better and effectively increase the upload efficiency of the P2P or P2SP network. The process of FIG. 6 can be performed periodically or in response to requests or on demand.

In the illustrated embodiment in FIG. 1, the client device 101 includes an upload control module 152 and a bandwidth measurement module 154. The upload control module 152 collects client information relating to uploads from the client. An example of this client information includes local configuration information, such as user-set parameters, upper limit of upload and/or download speed (i.e., upload speed limit and download speed limit), network speed limit conditions, maximum number of tasks, maximum number of connections, current network type of the client (such as LAN, ADSL or modem), and local IP address. Client information may also include network node information, such as number of network channels connected to the client device 101, information about the network channels, and information about the entity on the opposite end of the network channel (e.g., type of client or server, network type of the client or server, etc.). Because the upload performance of the client device 101 is closely related to the local bandwidth, the client information may also include local upload or download bandwidth. The control module 152 may also send upload configuration requests to the upload scheduling system 100.

According to the upload configuration information provided by the upload strategy server 114, the client device 101 reconfigures the local configuration parameters. For example, for a client device 101, the number of upload channels is generally not more than 200, and the number of channels per source file is not more than 8. That is, one file can provide the upload source for multiple channels simultaneously. If, after connection is established between both sides of a channel, on one side, the client device 101 detects locally that any of these limits is exceeded, then the client device 101 may suspend the connection, and the peer (e.g., another client device 101) on the opposite side of the channel may receive an error code showing that a download request cannot be met because the uploads from the client device 101 on the other side of the channel exceed the limit. If it is detected that they are channels in the same local area network (LAN), the upload limit can be relaxed.

Figure 7A:
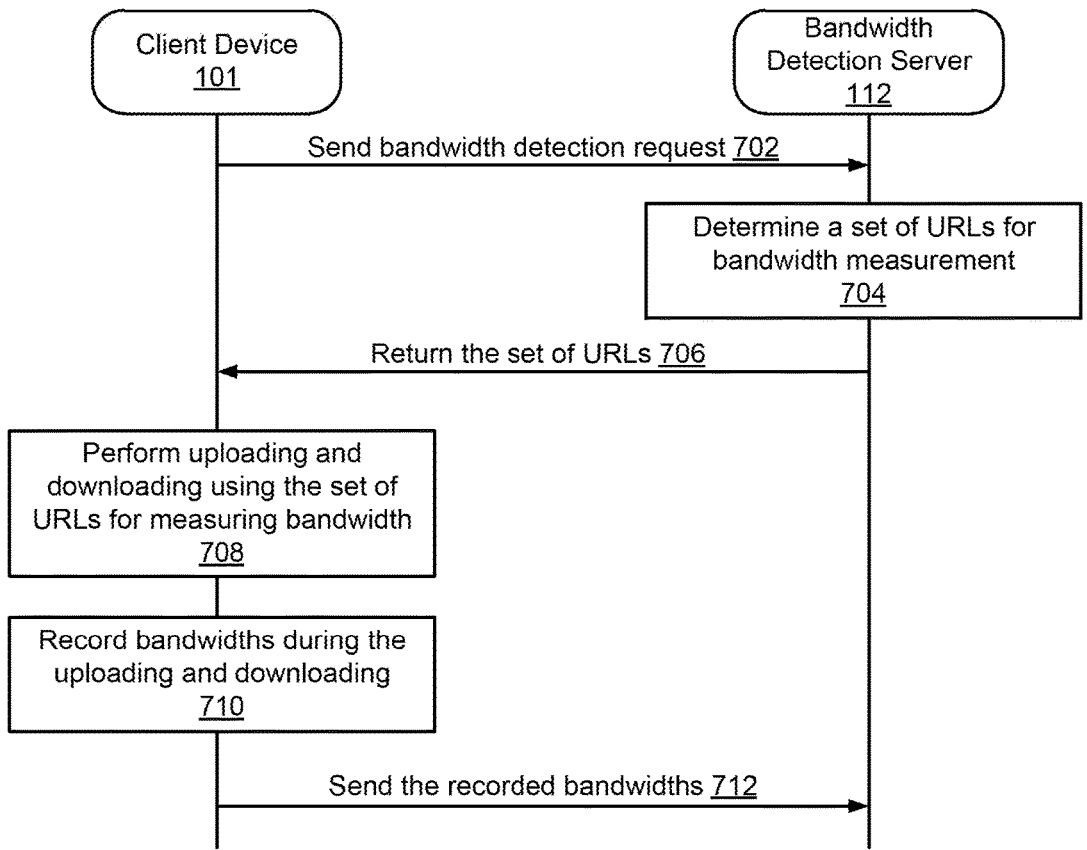
FIGS. 7A-7B are flowcharts illustrating a communication process for detecting bandwidth of a client according to various embodiments.

The bandwidth measurement module 154 (in client device 101) and the bandwidth detection server 112 (in the upload scheduling system 100) determine the upload and/or download bandwidth of the client device 101. Referring to FIG. 7A, a communication process for detecting bandwidth of a client device 101 according to various embodiments of the present disclosure is illustrated. In the illustrated embodiment, the communication process is conducted between the client device 101 and the bandwidth detection server 112. Initially, the client device 101 sends 702 a bandwidth detection request to the bandwidth detection server 112. Responsive to receiving the request, the bandwidth detection server 112 determines 704 a set of URLs for bandwidth measurement. The bandwidth detection server 112 returns 706 the set of URLs to the client device 101. The client device 101 performs 708 upload and download operations in accordance with the set of URLs. The client device 101 records 710 the upload and download bandwidths and sends 712 the recorded bandwidths to the bandwidth detection server 112 for storage.

Figure 7B:
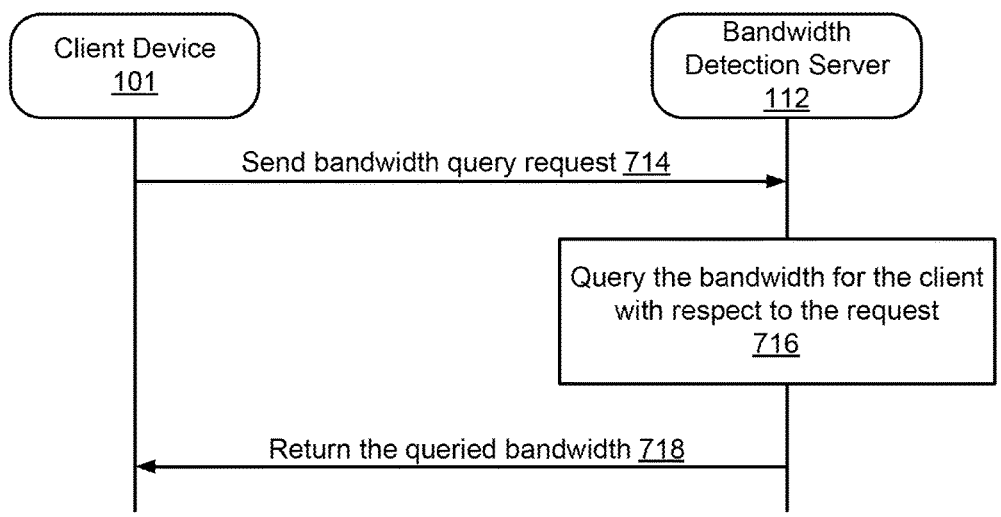

Referring to FIG. 7B, a communication process for returning the bandwidth of a client device 101 according to various embodiments of the present disclosure is illustrated. In the illustrated embodiment, the client device 101 sends 714 a bandwidth query request to the bandwidth detection server 112. The bandwidth detection server 112 inquires 716 (e.g., looks up) the upload and download bandwidth of the client device 101 according to the bandwidth inquiry request, and returns 718 the upload and/or download bandwidths of the client device 101 to the client device 101.

The embodiment adds a bandwidth detection server 112 to the P2SP network. The bandwidth detection server 112 provides the interface for inquiring the local bandwidth for the client device 101 and provides the service for inquiring local upload or download bandwidth for the client device 101, thus acquiring the upload or download speed of client devices 101.

Returning to FIG. 1, in addition to the upload strategy server 114 and bandwidth detection server 112, the upload scheduling system 100 also includes a resource index database (DB) 102, a resource indexing server 104, a resource importing server 106, a tracker server 108, and a statistics server 116. Various other embodiments of an upload scheduling system 100 may contain different functional modules and different number of modules. In addition, the functions may be distributed among the components in a different manner than described herein.

The resource index DB 102 stores index information associated with network resources. The index information can be used by the resource indexing server 104 to retrieve address information of downloaded network resources. According to various embodiments of the present disclosure, the URL of a network resource is used as the index for the network resource. The network resource can also be identified by a hash value associated with the network resource, e.g., a hash of the file ID of the network resource. If a network resource is identified by its corresponding hash value, the URL of the network resource may also be associated with the hash value of the network resource. For example, the resource index database 102 stores a mapping relation record of the URL of the network resource and the hash value of the network resource. According to various embodiments of the present disclosure, the resource index database 102 may also store validity checking information associated with a part of the network resource, e.g., a file fragment. Accordingly, when the resource index database 102 receives inquiry requests from the resource indexing server 104, the resource index database 102 can provide the requested data. Further, the resource index database 102 also receives requests for importing data to the database 102 and updating stored data from the resource importing server 106, and stores imported data and updates stored data responsive to the requests.

The resource indexing server 104 receives requests from one or more other servers of the upload scheduling system 100 and queries the resource index database 102 with respect to the requests. Along with the request, the hash value of the data may also be received. The resource indexing server 104 queries the resource index database 102 for the URL of the data mapped from the hash value of the data.

The resource importing server 106 receives a link and size of data to be uploaded. The resource importing server 106 calculates the hash value and validity checking information of the file. The resource importing server 106 stores the hash value and validity checking information of the file to the resource index database 102, via the resource indexing server 104.

The tracker server 108 receives on-line status and locally collected resource information from the client device 101. According to various embodiments of the present disclosure, the tracker server 108 can be a P2P tracker server for supplying data from the P2P network. Although only one tracker server 108 is illustrated in FIG. 1, other embodiments of the present disclosure may include multiple tracker servers 108. In one implementation, the tracker server 108 includes a front end and a back end. The client device 101 may acquire information from other front end servers. The client device 101, as a network node, maintains the communication of the reporting, heartbeat, addition and/or deletion files, and shares the files, registers in a back end service process, accepts a request to inquire peer client devices 101, and forwards the request to the back end service process. The front end server provides registration synchronization of peer nodes (e.g., client devices 101) and maintains a list of on-line peer nodes. The front end server implements a peer node selection algorithm and provides the peer node inquiry service.

The statistics server 116 receives reports about data downloads from the client devices 101. For example, the detailed reports may describe download speed of the downloaded file from multiple P2SP communication system sources, downloaded files' sizes, download time, downloaded data from P2P sources, original sources of the downloaded data, network connectivity, download result, and any other information describing the file downloading. The statistics server 116 generates logs based on the received reports on a daily basis for subsequent analysis and scheduling strategy determination. Further, the statistics server 116 may analyze the reports from the client devices 101 to generate statistics based on the reports. For example, the statistics can describe a mean value of the download speed within a certain time period of a day. The statistics server 116 provides the statistics to upload strategy server 114 for generating upload configuration information based on the statistics and providing the upload configuration information to the client devices 101.

The upload strategy server 114 implements the policy or strategy for P2P upload scheduling. It provides services to the client devices 101 for inquiring real-time upload policy or strategy, according to the configuration information of the client local network and the prior upload and download speed configuration information. The upload strategy server 114 collects the information reported by the client devices 101, calculates reasonable peer configuration information, and helps to connect peers with each other within a LAN. The upload strategy server 114 provides upload configuration information to the client devices 101. The upload configuration information may be explicit instructions, but it might also be information from which the client device 101 derives instructions. Examples of the upload strategy server 114 are described in more detail below with reference to FIGS. 4, 5, and 8-13.

The resource server 130 stores metadata related to the network resources. For example, the metadata related to the network resources may include sources (e.g., URLs) or addresses of download entrance web pages. Other metadata of the network resources known to those of skills in the art are possible. According to various embodiments of the present disclosure, the resource server 130 can support one or more network resource indexing websites.

The sources 140 are data storage devices (CDNs and other devices) that store network resources for downloading. According to various embodiments of the present disclosure, the sources 140 include one or more web servers that support one or more websites that host the data of the network resources. The sources 140 may also include nodes in a P2P or P2SP network.

The network 110 enables communications among the upload scheduling system 100, client devices 101, the resource server 130, and the sources 140 and can comprise the Internet. According to various embodiments of the present disclosure, the network 110 uses standard communications technologies and/or protocols such as BT protocol in a P2P and P2SP communication system. According to various other embodiments of the present disclosure, the entities can use custom and/or dedicated data communications technologies instead of, or in addition to, the ones described above.

Figure 2:
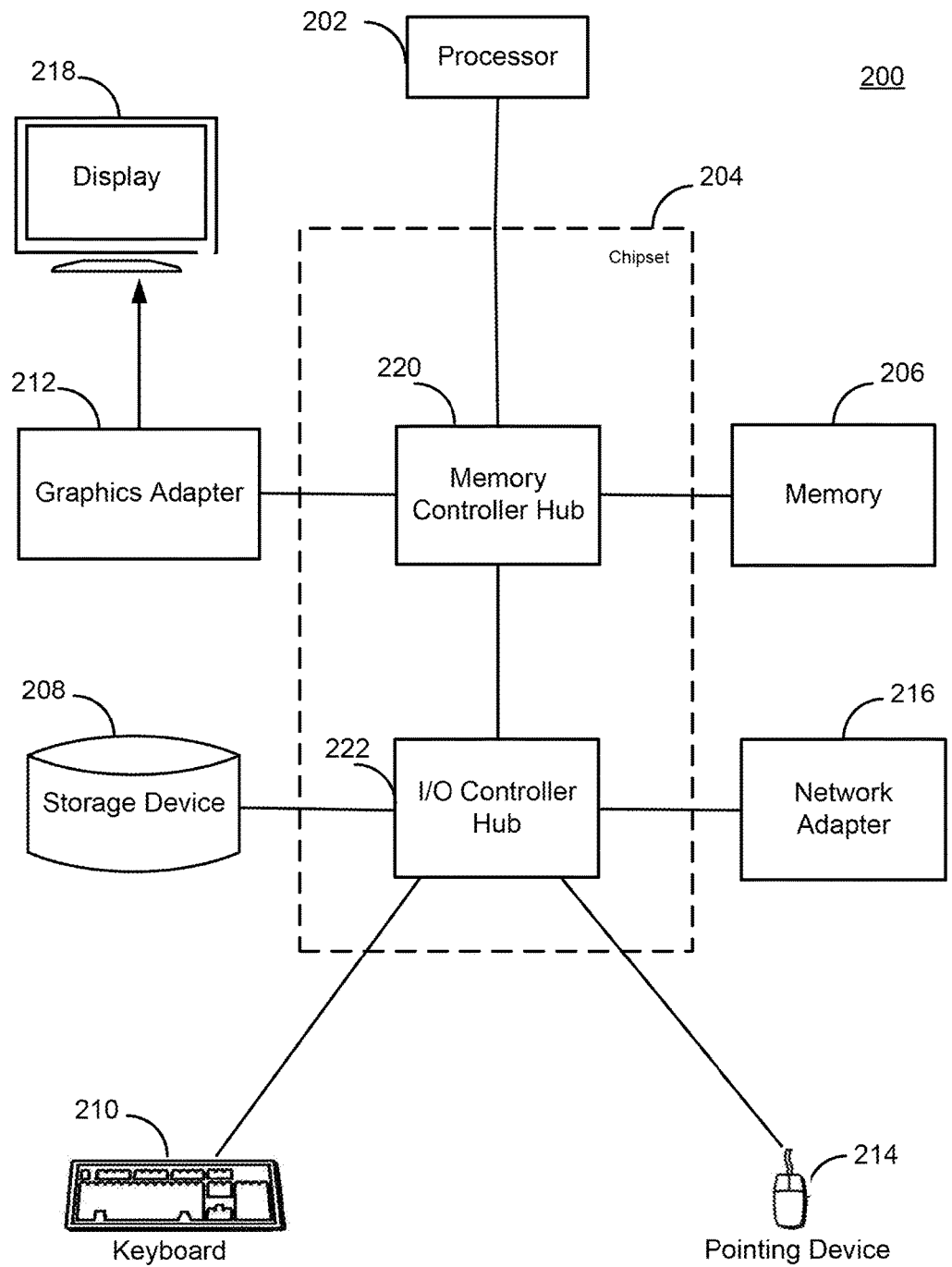
FIG. 2 is a block diagram illustrating an example of a computer for acting as a client and/or server according to various embodiments.

The entities shown in FIG. 1 are implemented using one or more computers. FIG. 2 is a high-level block diagram of a computer 200 for acting as the upload scheduling system 100, the resource server 130, the source 140, and/or a client device 101a-n. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. According to various embodiments of the present disclosure, the functionality of the chipset 204 is provided by a memory controller hub 220 and an I/O controller hub 222. In various other embodiments, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 110.

As is known in the art, a computer 200 can have different and/or other components than those shown in FIG. 2. In addition, the computer 200 can lack certain illustrated components. For example, the computers acting as the upload scheduling system 100 can be formed of multiple blade servers linked together into one or more distributed systems and lack components such as keyboards and displays. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. According to various embodiments of the present disclosure, program modules are stored on the storage device 208, loaded into the memory 206, and executed by the processor 202.

Figure 3:
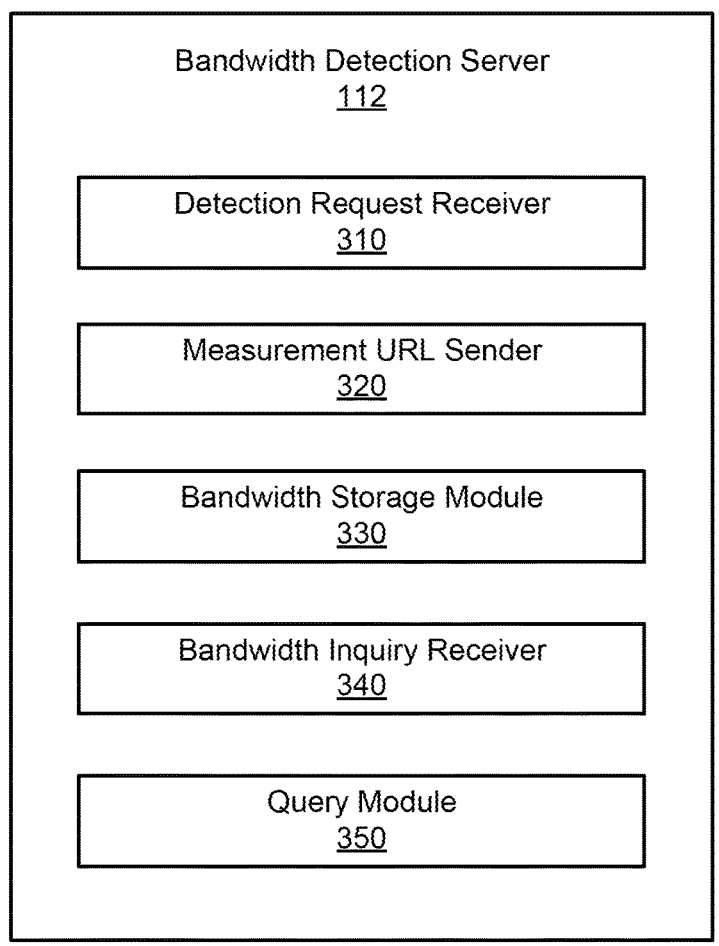
FIG. 3 is a block diagram illustrating a bandwidth detection server according to various embodiments.

FIG. 3 is a block diagram illustrating an example of a bandwidth detection server 112. The bandwidth detection server 112 receives requests for detecting bandwidth from the client device 101 and provides data to the client device 101 that can use the data to measure upload or download bandwidth. Further, the bandwidth detection server 112 receives the measured bandwidth from the client device 101 and stores bandwidth information describing the measured bandwidth of the client device 101, e.g., in a local database (not pictured). Therefore, when the client device 101 sends a request for bandwidth information, the bandwidth detection server 112 queries the database for the bandwidth information for the client device 101.

In the embodiment shown in FIG. 3, the bandwidth detection server 112 includes a detection request receiver 310, a measurement URL sender 320, a bandwidth storage 330, a bandwidth inquiry receiver 340, and a query module 350.

The detection request receiver 310 receives a bandwidth detection request from a client device 101 for detecting an upload or download bandwidth of the client device 101. According to various embodiments of the present disclosure, the client device 101 requests bandwidth detection periodically and, accordingly, the detection request receiver 310 receives the bandwidth detection requests periodically. For example, the client device 101 requests bandwidth detection every one hour, two hours, five hours, etc. In various other embodiments of the present disclosure, the client device 101 may request bandwidth detection when or before requesting network resources from a peer (e.g., a server, another client device 101) in a P2P or P2SP network. In this way, the client device 101 may use the detected bandwidth to request an upload configuration strategy from the upload scheduling system 100 to instruct settings of the uploads that may occur while the client device 101 downloads network resources from the peer. In this case, the detection request receiver 310 receives a request for bandwidth detection from the client device 101 when or before the client device 101 requests network resources.

The measurement URL sender 320 determines one or more URLs for measuring local bandwidth for the client device 101 and sends the one or more URLs to the client device 101. For example, responsive to the detection request receiver 310 receiving a bandwidth detection request, the measurement URL sender 320 determines a set of multiple URLs for measuring local bandwidth for the client device 101. The URLs link to network resources that can be downloaded by the client device 101. In addition, the URLs also link to storage of peers to which the client device 101 can upload network resources. The measurement URL sender 320 sends the set of URLs to the client device 101 for the client device 101 to implement the downloads and/or uploads using the URLs and record an upload and/or download bandwidth during the implementation of the downloads and/or uploads.

The bandwidth storage module 330 receives the upload and/or download bandwidth recorded by the client device 101 and stores bandwidth information describing the upload and/or download bandwidth of the client device 101, e.g., in a local storage or database. According to various embodiments of the present disclosure, the bandwidth storage module 330 generates a table storing the measured upload and/or download bandwidth of the client devices 101. For example, the table may include an identity for each client device 101 and corresponding upload and/or download bandwidth of the each client device 101 measured upon different requests and at different dates and times.

The bandwidth inquiry receiver 340 receives a bandwidth inquiry from a client device 101. For example, the client device 101 may make a bandwidth inquiry when or before requesting network resources from a peer (e.g., a server, another client device 101) in a P2P or P2SP network. In this way, the client device 101 may use a returned bandwidth to request an upload configuration strategy from the upload scheduling system 100 to instruct settings of the uploads that may occur during the client device 101 downloads the network resources from the peer.

The query module 350 obtains the bandwidth information of the client device 101 and provides the obtained bandwidth information to the client device 101. For example, responsive to the bandwidth inquiry receiver 340 receiving a bandwidth inquiry from a client device 101, the query module 350 can query the local storage or database for the corresponding bandwidth information describing an upload and/or download bandwidth of the client device 101. The query module 350 sends the corresponding bandwidth information to the client device 101.

Figure 4:
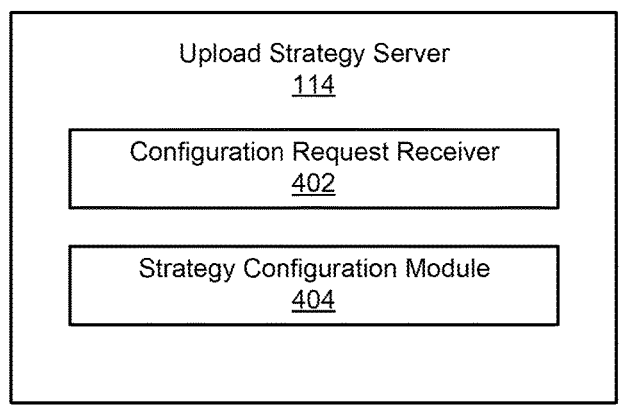
FIG. 4 is a block diagram illustrating an upload strategy server according to various embodiments.

FIG. 4 is a block diagram illustrating the upload strategy server 114 according to various embodiments of the present disclosure. The upload strategy server 114 acquires client information from the client device 101 and determines upload configuration information for the client device 101 based on analysis of the client information, usually also considering other information. In the illustrated embodiment, the upload strategy server 114 includes a configuration request receiver 402 and a strategy configuration module 404.

The configuration request receiver 402 receives an upload configuration request from the client device 101. By the request, the client device 101 requests upload scheduling or configuration information from the upload strategy server 114. According to various embodiments of the present disclosure, the client device 101 sends the upload configuration request periodically. According to various other embodiments of the present disclosure, the client device 101 sends the upload configuration request when or before requesting network resources from a peer (e.g., a server, another client device 101).

According to various embodiments of the present disclosure, the configuration request receiver 402 may also receive client information along with the upload configuration request. For example, the client information may include local configuration information, network node information, and upload/download bandwidth information collected by the client device 101. The local configuration information may include parameters of the client device 101 set by a user of the client device 101. Examples of the parameters may include, but may not be limited to, network speed limit conditions (e.g., no limit set by the user, user setting a limit), upper limit for upload and/or download speed, maximum number of tasks, and maximum connections. The local configuration information may also include the current network type of the client device 101, such as Local Area Network (LAN), Asymmetric Digital Subscriber Line (ADSL) or Modem. Additionally, the local configuration information may also include the local IP address.

The network node information may include a number of channels connected with the client device 101, type of the opposite end server and network type of the opposite end server. Further, the local upload and/or download bandwidth of the client device 101 is also an important factor affecting the upload performance of the client device 101. Therefore, the local upload and/or download bandwidth is also sent by the client device 101 to the upload strategy server 114 as one of the important parameters to determine the upload configuration policy for the client device 101.

As an example, the client information associated with an upload configuration request is shown in Table 1.

TABLE 1

Example of Client Information

| Name of client information | Description |
| --- | --- |
| Network type | Network connection type: −1: Unknown; 0: LAN; 1: ADSL; 2: Modem |
| Internal IP | Local IP acquired by PEER |
| User Set Download Limit | Max download speed currently set by user (unit: byte per second) |
| User Set Upload Limit | Max upload speed currently set by user (unit: byte per second) |

TABLE 1-continued

Example of Client Information

| Name of client information | Description |
| --- | --- |
| TCP Same NAT Down Max | Download speed peak of TCP Intranet (unit: byte per second) |
| TCP Same NAT UP Max | Upload speed peak of TCP Intranet (unit: byte per second) |
| TCP Diff NAT Down Max | Download speed peak of TCP public network (unit: byte per second) |
| TCP Diff NAT UP Max | Upload speed peak of TCP public network (unit: byte per second) |
| UDP Down Max | Download speed peak of UDP (unit: byte per second) |
| UDP UP Max | Upload speed peak of UDP (unit: byte per second) |
| Busy UPload Interval | Running time of download task reported since the last time (unit: millisecond) |
| Busy UPload Bytes | Data volume uploaded by download task reported since the last time (unit: byte) |
| Idle UPload Interval | Running time when the download status is idle reported since the last time (unit: millisecond) |
| Idle UPload Bytes | Data volume uploaded when the download status is idle reported since the last time (unit: byte) |
| OnLineTime | Online time (unit: second) |
| DownloadTime | Download time (unit: second) |
| UPload Time | Upload time (unit: second) |
| TotalReceiveBytes | Download bytes |
| TotalSendBytes | Upload bytes |
| UPloadCount | Number of PEERs uploading |
| PureUPloadCount | Number of PEERspurely uploading |
| UPDownCount | Number of PEERs that perform uploading as well as downloading |

The strategy configuration module 404 determines upload scheduling configuration policy for the client device 101 based on analysis of the client information. According to various embodiments of the present disclosure, responsive to the configuration request receiver 402 receiving the upload configuration request along with the client information, the strategy configuration module 404 determines upload configuration information for the client device 101 to configure its upload parameters. According to various other embodiments of the present disclosure, the strategy configuration module 404 periodically gathers the client information reported by the client device 101, acquires network information of the local network, and determines the upload configuration information for the client device 101. For example, upload configuration information may include multiple parameters for configuring the uploads for the client device 101 and helping the client device 101 to bring the optimal upload efficiency in the P2SP network that includes mutual communication between peers. An example of upload configuration information is shown in Table 2.

TABLE 2

Example of Upload Configuration Information

| Field Value | Description |
| --- | --- |
| Interval | It is a time interval for requesting the upload configuration information (unit: hour). For example, a number of 24 means that the request for acquiring the upload configuration information may not be sent within 24 hours. |
| ReseStatisticPeriod | This defines a period for deleting old statistics of the peak value of download and upload speeds of the client device (unit: hour). It is used for re-generating updated statistics periodically. For example, a value of 168 means removing the old data and generating new statistics in a period of 7 days. A value of 24 means removing the old data and generating new statistics in the period of 1 day. If 0 is returned, it means emptying old data immediately. |

TABLE 2-continued

Example of Upload Configuration Information

| Field Value | Description |
|---|---|
| External IP | The external IP address of the client device. For example, it is the visible IP address of the public network. |
| User Idle UP SPeed Ratio | The percentage of the TCP public network speed to which the upload speed is limited when the client device is idle and when there is no speed limit and no task for the Peer. The default percentage is 50%. |
| User Idle UP SPeed Min | The minimum value of the upload speed when the client device is idle and when there is no speed limit and no task for the Peer. The default value is 10 KB. |
| User Idle UP SPeed Max | The maximum value of the upload speed when the client device is idle and when there is no speed limit and no task for the Peer. The default value is 800 KB. |
| Idle UP SPeed Ratio | The percentage of the TCP public network speed to which the upload speed is limited when there is no speed limit and no task for the Peer. The default percentage is 50%. |
| Busy UP SPeed Max | The maximum value of the upload speed when there is at least one task, but no speed limit to the Peer. The default value is 1024 KB. |
| Busy UP Trough Interval | The period of the trough (unit: millisecond) used in the wave-like speed limit pattern when there is at least one task but no speed limit to the Peer. The period is 20000 milliseconds by default. |
| Busy UP Trough Ratio | The ratio (or percentage) of the trough value to the crest value used in the wave-like upload speed limit pattern when there is at least one task but no speed limit to the Peer. A default percentage is 80%. |
| Busy UP Crest Interval | The period of the crest (unit: millisecond) used in the wave-like speed limit pattern when there is at least one task, but no speed limit to the Peer. The period is 3000 milliseconds by default. |
| Pure UPload PiPe Max | Maximum number of pure upload channels, usually not more than 200 |
| Res Query SPeed Threshold | The speed threshold for triggering querying the resource again. The default value is 30 KB. |
| Res Query Check Interval | The period for checking if query the resource again. The default value is 20 seconds. |
| Res Query SPeed Ratio | This describes a percentage of the maximum download speed. When the download speed is lower than this percentage, a re-querying is trigger. The percentage is 10% by default. |
| Pure UPload File Max | Maximum number of files that the client device uploads if purely uploading. The default value is 8. |
| Non-blocking Update | Interval for updating Non-blocking quota. (unit: Interval millisecond) The default value is 20000 milliseconds. |

Typically, the P2P client, such as the client device 101, takes on the roles of client and server at the same time. Each client device 101 in the P2P/P2SP network increases its own download speed as much as possible. For example, in order to achieve a higher download speed, a first client device 101 downloads files from any second client devices 101 at the opposite end of the channels that the first client device 101 can connect with. In return, the first client device 101 provides an upload at a certain speed to each of the second client devices 101 according to the download speed provided by the second client device 101. Further, the first client device 101 can block one or more of the second client devices 101 if the one or more of the second client devices 101 do not cooperate. Blocking a client device 101 may refer to blocking an upload channel or download channel connected by the client device 101. Alternatively, blocking a client device 101 may refer to blocking upload service or download service of a channel connected by the client device 101. For example, when upload service is blocked in a channel, although the upload stops, the download still continues. Further, the blocking may be a temporary rejection to upload request. It is not necessary to re-establish the connection when the blocking stops.

According to various embodiments of the present disclosure, the upload configuration strategy may include the upload speed limit strategy and the blocking/non-blocking strategy.

Figure 5:
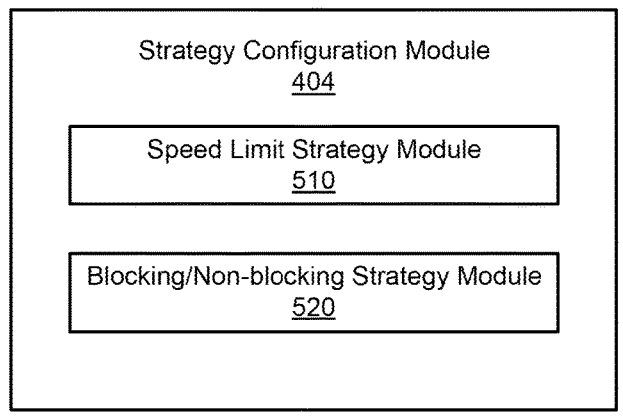
FIG. 5 is a block diagram illustrating a strategy configuration module according to various embodiments.

Referring to FIG. 5, one embodiment of the strategy configuration module 404 is illustrated. The strategy configuration module 404 determines the upload configuration strategy (or adjustments of the strategy) based on the download status of the client device 101 and statistics of the historical downloads and uploads performed by the client device 101. In the illustrated embodiment, the strategy configuration module 404 includes a speed limit strategy module 510 and a blocking/non-blocking strategy module 520.

The speed limit strategy module 510 determines a configuration for setting network speed limit to the upload (also referred to as an upload speed limit) for the client device 101. For example, an upload speed limit may be the upper limit of the upload speed. According to various embodiments of the present disclosure, the speed limit strategy module 510 extracts the download status of the client device 101 from the network node information. Further, the speed limit strategy module 510 detects whether there is an upload speed limit set by the client device 101 based on the local configuration information. If there is an upload speed limit set by the client device 101, the speed limit strategy module 510 determines if the set upload speed limit is equal to or more than a preset minimum speed value. If so, the speed limit strategy module 510 generates an upload speed limit strategy that does not update the set upload speed limit. If the upper limit value of the upload speed set by the user is too low, for example, the upload speed limit is set to be one byte per second (byte/s), then the set upload speed limit is considered unreasonable and the speed limit strategy module 510 regards it as that the user does not set an upload speed limit and updates the set upload speed limit as following.

If the set upload speed limit is less than the preset minimum speed value, the speed limit strategy module 510 extracts a historical peak value of upload speed for the client device 101 from the upload and/or download bandwidth information, and detects whether the download status of the client device 101 is busy.

When the download status of the client device 101 is the idle, the speed limit strategy module 510 determines that the upload speed limit is the product of the historical peak value of upload speed and an idle rate. According to various embodiments of the present disclosure, the idle rate indicates how much the download status of the client device 101 is idle. For example, if 60% of the time the client device 101 is idle, the idle rate for the client device 101 is 60%. Generally, the idle rate is 50% when the download is performed on the TCP public network and is 80% when the download is performed on the TCPLAN.

In addition, the historical peak value of upload speed is calculated by the client device 101 step by step. According to various embodiments of the present disclosure, the historical peak value of upload speed is the highest upload speed value that the client device 101 has ever reached when connecting to the TCP public network. For example, the historical peak value of upload speed may be 10×1024 byte/s, by default. Further, the speed limit strategy module 510 may determine an upload speed limit range, allowing the upload speed limit to fluctuate within the range. For example, the range is between the minimum value and the maximum value of upload speed limit when the download status of the client device 101 is idle, e.g., [10×1024 byte/s, 800×1024 byte/s] by default.

When the download status of client device 101 is busy, the speed limit strategy module 510 extracts from the upload and/or download bandwidth information a historical maximum value of upload speed when the download status of the client device 101 was busy in the past. The speed limit strategy module 510 determines a range of upload speed limits for the client device 101 based on the historical peak value of upload speed, the historical maximum value of upload speed when the download status of the client device 101 was busy, and a busy rate. The range is specified by a crest value and a trough value. For example, the range is between the crest value and the trough value. The crest value can be the maximum value of upload speed when the download status of the client device 101 was busy. For example, the crest value may be 1024×1024 byte/s, by default. The trough value can be a product of the historical peak value of upload speed of busy rate. The busy rate indicates how much the download status of the client device 101 is busy. For example, the busy rate may be 80%, by default.

In addition, the speed limit strategy module 510 can also determine a duration time period for each of the crest value and the trough value of upload speed limit, respectively. For example, the duration time period for the crest value and the trough value may be 30 seconds and 20 seconds, respectively. The speed limit strategy module 510 generates an upload speed limit strategy to instruct the client device 101 to set the upload speed limit at the crest value and at the trough value alternately according to the determined duration periods for the crest value and the trough value. Such a pattern of the upload speed limit setting may be referred to as wave-like speed limit pattern.

In this way, the speed limit strategy module 510 formulates the dynamic speed limit configuration according to the task state of the client device 101 at current data transmission time, the upload speed limit set by the user, and the historical upload and/or download bandwidth of the client device 101. This beneficially balances the capacity of the client device 101 as a P2P network node and the P2P network condition sufficiently and improves the overall performance of P2P network.

The blocking/non-blocking strategy module 520 determines blocking/non-blocking strategy as part of the upload configuration information for the client device 101 to configuring uploads. For example, the blocking/non-blocking strategy indicates which peer or peers (and the corresponding channel or channels connecting the peer or peers to the client device 101) are to be blocked or unblocked. According to various embodiments of the present disclosure, the blocking/non-blocking strategy module 520 determines updated blocking/non-blocking strategy periodically. For example, the blocking/non-blocking strategy module 520 determines a different blocking/non-blocking strategy at every interval, for example, every 20 seconds. Such a determined blocking/non-blocking strategy is maintained in the next 20 seconds. This beneficially reduces waste of network resources caused by frequently blocking and non-blocking a peer or peers.

According to various embodiments of the present disclosure, the blocking/non-blocking strategy module 520 acquires one or more channels in the same LAN as the client device 101 based on the network node information. The blocking/non-blocking strategy module 520 determines a blocking/non-blocking strategy for setting the one or more acquired channels to be unblocked. In this way, the blocking/non-blocking strategy module 520 gives a higher priority to channels in the same LAN as the client device 101, avoiding a long time wait before peers in the network can obtain resources. In addition, the channels in the same LAN as the client device 101 may be set to be unblocked by default and be able to directly provide an upload. This can effectively shorten the time required for starting download from network nodes, and is advantageous for increasing the utilization of upload bandwidth and improving the document distribution performance of P2P network.

The blocking/non-blocking strategy module 520 determines an upper limit (represented by "W") for the number of unblocked channels, based on the network node information. According to various embodiments of the present disclosure, the blocking/non-blocking strategy module 520 acquires the number of tasks from the network node information and determines the upper limit W of the number of the unblocked channels using the following equation:

$$W=\min\{A1,\max[A2,\text{the number of tasks}\times A3]\}, \quad (1)$$

Where A1 is the empirical value of the upper limit of the number of unblocked channels; A2 is the empirical value of the lower limit of the number of channels; and A3 is the empirical value of multiplying power of the number of tasks. According to the above equation, it will be understood by those with ordinary skill in the art that the maximum value of W is A1. For example, if A1=200, A2=40, A3=30, W=min{200, max [40, the number of tasks×30]}. If the number of tasks is 5, W=150; and if the number of tasks is 10, W=200.

Further, the blocking/non-blocking strategy module 520 acquires the number of new channels from the network node information. For example, the new channels may be the channels that join to the network newly. No blocking or non-blocking state has been set for the new channels. The new channels also have not been used for uploading or downloading. A channel that is not a new channel is referred to as an old channel. An old channel has a set blocking or non-blocking state and has been used for uploading or downloading by the client device 101. Therefore, to utilize new channels for more uploading and downloading, the blocking/non-blocking strategy module 520 sets the probability for unblocking a new channel as three times that of an old channel.

The blocking/non-blocking strategy module 520 determines whether the number of new channels is greater than or equal to a product of W and a first preset rate. For example, the empirical value for the first preset rate may be 0.4. If so, which means there are a relatively large number of new channels, the blocking/non-blocking strategy module 520 selects certain old channels in one or more different LANs from that of the client device 101 and determines the strategy to block unselected old channels. The selected old channels in the one or more different LANs from that of the client device 101 have download speeds greater than or equal to a first preset speed. For example, the empirical value for the first preset speed may be 10 K byte/s. The blocking/non-blocking strategy module 520 generates a blocking/non-blocking strategy to keep the selected old channels with download speeds greater than or equal to the first preset speed unblocked. Further, according to various embodiments of the present disclosure, the blocking/non-blocking strategy module 520 assigns the unselected old channels as a first set of candidate channels to be kept unblocked. The blocking/non-blocking strategy module 520 will further analyze the first set of candidate channels along with the new channels and a second set of candidate channels (that will be described below) to reset the blocking/non-blocking states thereof. The further analysis will be described in further detail below.

When the number of new channels is less than a product of W and the first preset rate, which means there are less new channels, the blocking/non-blocking strategy module 520 may select more old channels to keep unblocked. According to various embodiments of the present disclosure, the blocking/non-blocking strategy module 520 ranks the old channels in one or more different LANs from that of the client device 101 based on their download speeds to generate a ranking. Among the top certain number (represented by "T") of the old channels in the ranking, the blocking/non-blocking strategy module 520 selects the old channels whose download speeds are greater than or equal to a second preset speed and keeps them unblocked. According to various embodiments of the present disclosure, the number T may be determined as a product of W and a second preset rate. For example, an empirical value for the second preset speed may be 1 K byte/s. An empirical value for the second preset rate may be 0.8.

Further, according to various embodiments of the present disclosure, the blocking/non-blocking strategy module 520 assigns the unselected old channels as a second set of candidate channels to be kept unblocked. The blocking/non-blocking strategy module 520 will further analyze the second set of candidate channels along with the new channels and the first set of candidate channels to reset the blocking/non-blocking states thereof.

The number of the channels (also referred to as a quota of channels) to be kept unblocked (or replaced and eliminated) is set as a sum of a first number (represented by "S"), a second number (represented by "M"), and a third number (represented by "N"), wherein, S is provided for the channels within the same LAN as the client device 101. Among the new and old channels, all channels within the same LAN as the client device 101 are to be set as unblocked.

According to various embodiments of the present disclosure, the blocking/non-blocking strategy module 520 detects channels in one or more LANs different from that of the client device 101. For example, the detected channels may include only old channels. In another example, the blocking/non-blocking strategy module 520 detects both old and new channels in the LANs different from that of the client device 101.

Further, the blocking/non-blocking strategy module 520 determines an integral value of each of the channels within the one or more LANs different from that of the client device 101. According to various embodiments of the present disclosure, the blocking/non-blocking strategy module 520 determines the type of each channel. For example, a channel can be determined as a pure upload channel, a hybrid channel simultaneously used for both upload and download, or a pure download channel.

When the channel is determined to be a pure upload channel, the integral value can be calculated using the following equation:

$$\text{Integral value} = \text{a currently sampled upload speed} \times B1 + \text{a channel priority coefficient} \times 5 + B2 \times 5. \quad (2)$$

Given that the transmission speed of a channel is faster if the client devices 101 on the both sides of the channel have the same type and the transmission speed of channel is slower if the client devices 101 on the both sides of the channel have different types, when the opposite client device 101 of the channel has the same type as the local client device 101, B1=0.5; when the opposite client device 101 of channel has a different type from the local client device 101, B1=0.1.

Further, the blocking/non-blocking strategy module 520 gives higher priorities to less popular network resources. When the number of tasks for resources on the opposite client device 101 of the channel is less than 5, B2=1; and when the number of tasks for resources on the opposite client device 101 of the channel is greater than or equal to 5, B2=0.

When the channel is simultaneously used for download and upload, the integral value can be calculated using the following equation:

$$\text{Integral value} = \text{a currently sampled download speed} \times B3 + \text{a channel priority coefficient} \times 5 + B2 \times 5. \quad (3)$$

Where, when the resources requested by the client device 101 are stored in the opposite client device 101 of the channel, B3=5; and when there is no resource in the opposite client of the channel requested by the client device 101, B3=0.

Further, the blocking/non-blocking strategy module 520 ranks the channels based on the integral values. The blocking/non-blocking strategy module 520 selects the top M channels based on the ranking and determines a blocking/non-blocking strategy to keep the top M channels unblocked. In this way, the channels with the largest integral values in the different LANs from the client device 101 can be found.

According to various embodiments of the present disclosure, the blocking/non-blocking strategy module 520 determines M old channels to be kept unblocked by extracting the historical peak value of upload speed and the maximum value of upload speed when the download status of the client device 101 was busy from the upload and/or download bandwidth information. The blocking/non-blocking strategy module 520 determines the smaller value (represented by "X1") of the historical peak value of upload speed and maximum value of upload speed when the download status of the client device 101 was busy.

Further, the blocking/non-blocking strategy module 520 acquires download status of the client device 101 from the network node information. When the download status of the client device 101 is idle, the blocking/non-blocking strategy module 520 determines a value (represented by "X2") by multiplying X1 by the idle rate. For example, as described above, the idle rate may indicate how much the download status of the client device 101 is idle. X2 equals to the product of X1 and the idle rate. When the download status of the client device 101 is busy, the blocking/non-blocking strategy module 520 determines the value X2 by multiplying X1 by a busy rate. For example, as described above, the busy rate may indicate how much the download status of the client device 101 is busy. X2 equals to the product of X1 and the busy rate.

Further, the blocking/non-blocking strategy module 520 extracts the speed limit set by the user from the local configuration information and determines the smaller value (represented by "X3") of X2 and the speed limit set by the user. If no speed limit is set by the user, X3=X2. The blocking/non-blocking strategy module 520 determines if X3 is greater than or equal to an adjustment range of step length (represented by "M_base"). When X3 ≥M_base, M=M_min+[X3−M_base]/M_step. When X3<M_base, M=M_min. M_min is a preset minimum value of the upper limit for the number of unblocked channels, and the default value of M_min can be four. M_step is a step length, and the default value of M_step can be 8×1024 byte/s. M_base is an adjustment range of step length, and the default value of M_base can be 64×1024 byte/s.

Further, according to various embodiments of the present disclosure, the blocking/non-blocking strategy module 520 acquires blocking time duration for the channels other than the top M channels within the one or more LANs different from the client device 101. The blocking/non-blocking strategy module 520 ranks the channels based on their blocking time duration. According to various embodiments of the present disclosure, a blocking time duration for a channel can indicate a time period or duration when the channel has been set as blocked. For example, assuming that a blocking time duration for a channel is 10 hours, this indicates that the channel has been blocked for 10 hours. Further, the blocking/non-blocking strategy module 520 select the top N channels from the ranking to determine the N channels that have been blocked the longest. That is, the N channels have been maintained to be blocked for the longest time among the remaining channels. The blocking/non-blocking strategy module 520 generates a blocking/non-blocking strategy as part of the upload configuration information to set the N channels to be unblocked. In this way, the blocking/non-blocking strategy module 520 provides the N quotas to the channels whose blocking time is the longest, after selecting the S channels and M channels to be unblocked. In addition, because the blocking or non-blocking state is not set for the new channels, the N channels usually may include only the old channels.

According to various embodiments of the present disclosure, given that the number of channels in the same LAN as the client device 101 is S, the blocking/non-blocking strategy module 520 determines N channels to be unblocked based on the determined W, S, M, and the number of the old channels that have been determined to be kept unblocked based on their download speeds, as described above. For example, the blocking/non-blocking strategy module 520 determines whether the number of new channels is greater than or equal to a product of W and the first preset rate. For example, as described above, the first preset rate can be 0.4. W is the upper limit for the number of unblocked channels. When the number of new channels is greater than or equal to the product of W and the first preset rate, the blocking/non-blocking strategy module 520 determines the number of old channels whose download speeds are greater than or equal to the first preset speed within LANs different from that of the client device (represented as Y1). As described above, the first preset speed may be 10 Kbyte/s. Accordingly, the blocking/non-blocking strategy module 520 determines N using the following equation:

$$N=W-S-Y1-M. \quad (4)$$

Further, when the number of new channels is less than the product of W and the first preset rate, the blocking/non-blocking strategy module 520 determines the number of old channels whose download speeds are greater than or equal to the second preset speed in the top T old channels (represented by "Y2"). As described above, the first preset speed may be 1 Kbyte/s. Accordingly, the blocking/non-blocking strategy module 520 determines N using the following equation:

$$N=W-S-Y2-M. \quad (5)$$

According to various embodiments of the present disclosure, the blocking/non-blocking strategy module 520 can alternatively determine N based on M. For example, the blocking/non-blocking strategy module 520 can set N to be of a certain ratio to M. For example, N may be determined as M/4, i.e., one fourth of M. This provides a simpler way to calculate N given M is determined.

Upload blocking can improve upload performance for a P2P network. Each peer in a P2P network usually maintains unblocked channels with a fixed number of other peers. By determining which peers should be set as unblocked according to the current download speed of the channels, the blocking/non-blocking strategy module 520 controls the P2P data flow within the local network or the same ISP, decreases the data flow crossing different ISPs, and therefore reduces network congestion caused by the P2P data flow. The blocking/non-blocking strategy module 520 also effectively reduces the time required for the network nodes to start downloading and increases the utilization of upload bandwidth.

Figure 8:
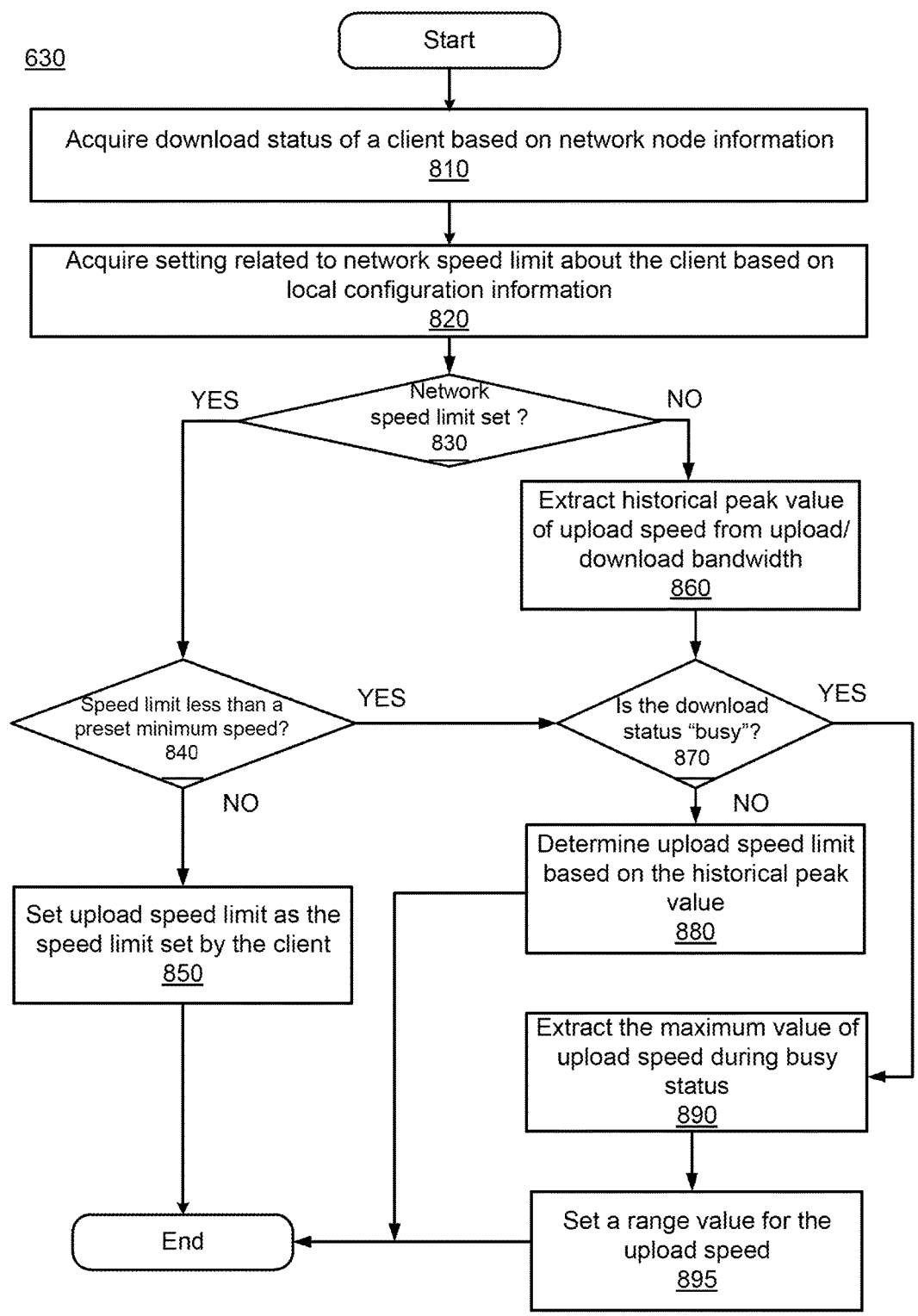
FIG. 8 is a flowchart illustrating a process for determining upload configuration information for a client device according to various embodiments.

FIG. 8 is a flowchart illustrating a process for determining upload configuration information for a client device 101 according to various embodiments of the present disclosure. Initially, the upload strategy server 114 obtains 810 download status of the client device 101 based on network node information of the client device 101. The download status of a client device 101 indicates whether the client device 101 is "busy" or "idle." The upload strategy server 114 also obtains 820 setting information related to network speed limit of the client device 101 based on local configuration information of the client device 101. The setting information of a client device 101 indicates whether the client device 101 has set a network speed limit and the value of the network speed limit if set. At step 830, the upload strategy server 114 examines whether the network speed limit was set by the client device 101.

Responsive to the network speed limit being set, the upload strategy server 114 determines 840 whether the network speed limit is less than a preset minimum network speed. If the network speed limit set by the client device 101 is larger than the preset minimum network speed, the upload strategy server 114 sets 850 the network speed limit set by the client device 101 as the upload speed limit for the client device 101 and exits the determination process. If the network speed limit set by the client device 101 is smaller than the preset minimum network speed, the upload strategy server 114 determines 870 whether the download status of the client device 101 is "busy". If the client device 101's download status is not "busy," the upload strategy server 114 determines 880 the upload speed limit for the client device 101 based on historical peak value of upload speed associated with the client device 101. If the client's download status is "busy," the upload strategy server 114 extracts 890 the maximum value of upload speed associated with the client device 101 in "busy" status and sets 895 a range value for the upload speed.

Responsive to the network speed limit not being set, the upload strategy server 114 extracts 860 historical peak value of upload speed associated with the client device 101 from upload or download bandwidth of the client device 101. Following the historical peak value of upload speed extraction, the upload strategy server 114 performs the steps 870-895 as described above to determine the upload speed for the client device 101 or a range value for the upload speed.

Figure 9A:
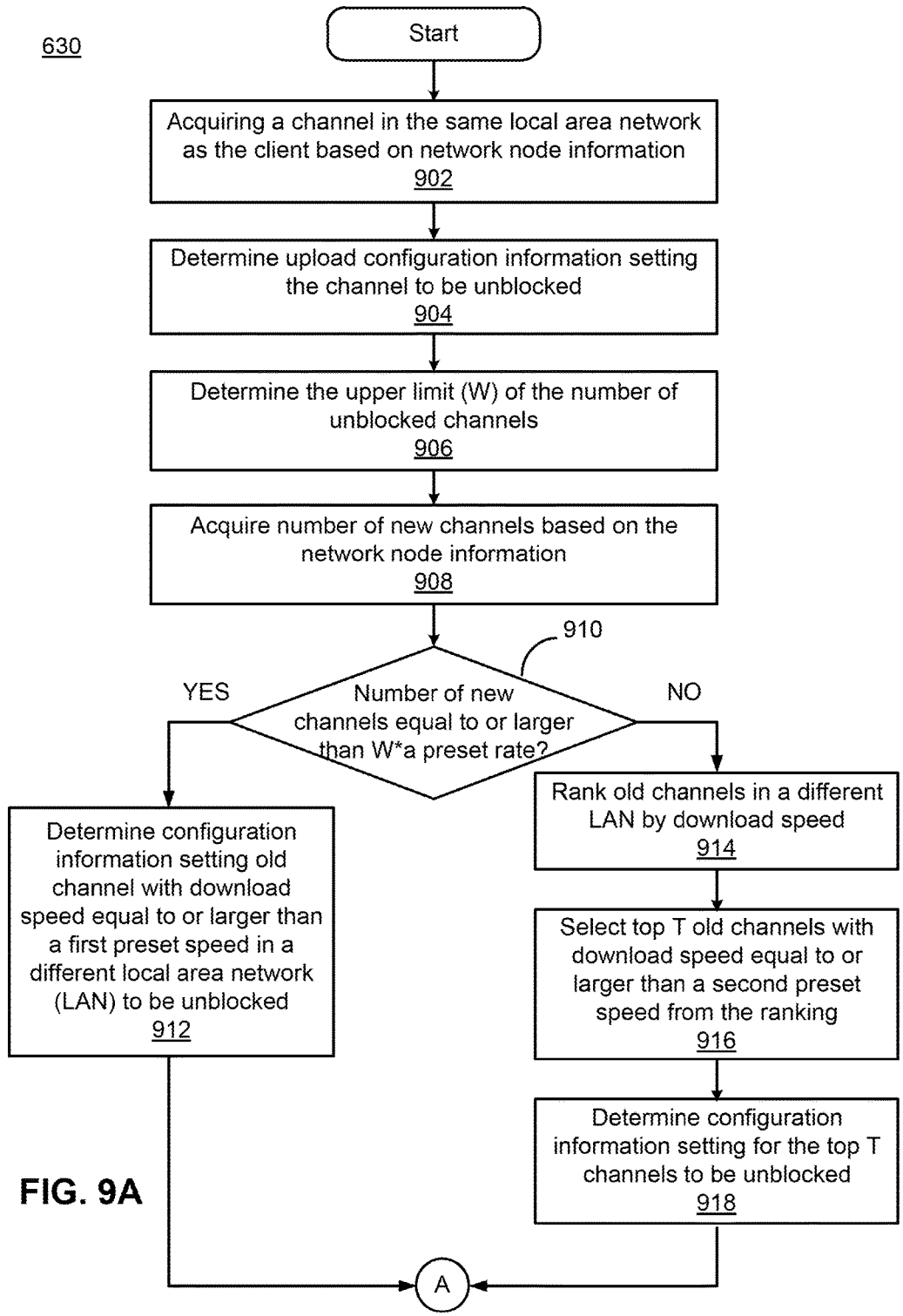
FIGS. 9A-9B is a flowchart illustrating a process for determining upload configuration information for a client device according to various embodiments.
Figure 9B:
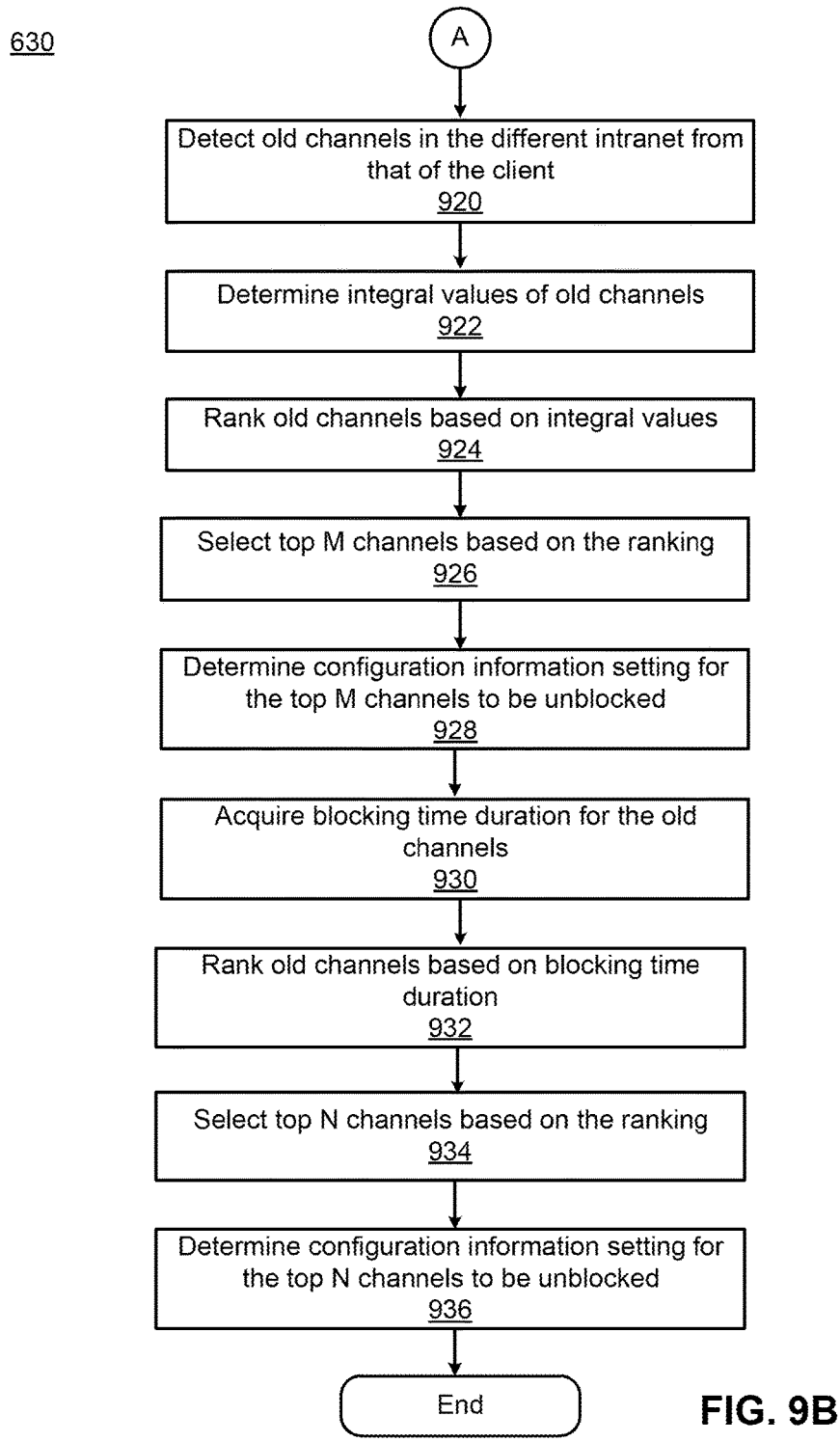

FIG. 9A and FIG. 9B illustrate a process for determining upload configuration information for a client device 101 according to various other embodiments of the present disclosure. FIG. 9A is a flowchart illustrating the first part of the process and FIG. 9B is a flowchart illustrating the second part of the process.

Initially, the upload strategy server 114 obtains 902 information of a channel in the same local area network (LAN) as the client device 101 based on the network node information associated with the client device 101. The upload strategy server 114 determines 904 upload configuration information as setting the channel to be unblocked, and determines 906 an upper limit (e.g., represented by parameter "W") of the number of unblocked channels. From the network node information associated with the client device 101, the upload strategy server 114 obtains 908 the number of new channels to be used by the client device 101.

The upload strategy server 114 checks 910 whether the number of new channels of the client device 101 is equal to or greater a predefined threshold value. In one embodiment, the predefined threshold value is defined as a product of the upper limit of the number of unblocked channels and a preset rate. Responsive to the number of new channels of the client device 101 being equal to or greater than the predefined threshold value, the upload strategy server 114 determines 912 configuration information as setting which one or more old channels with download speed equal to or larger than a first preset network speed in a different local area network are to be unblocked.

Responsive to the number of new channels of the client device 101 being smaller than the predefined threshold value, the upload strategy server 114 ranks 914 old channels in a different local area network based on download speeds of the old channels and selects 916, based on the ranking, a number of old channels (defined by parameter "T") with their download speeds equal to or greater than a second preset network speed. The upload strategy server 114 determines 918 configuration information as setting the selected old channels to be unblocked.

Following the process illustrated in FIG. 9B, the upload strategy server 114 detects 920 channels in one or more LANs different than the one where the client device 101 is located and determines 922 integral values of the channels. The channels can include new channels and old channels. An integral value of a channel is defined by one or more networking parameters, such as a currently sampled upload speed and channel priority coefficient. The upload strategy server 114 ranks 924 the channels based on the determined corresponding integral values of the channels and selects 926 one or more channels based on the ranking. The upload strategy server 114 determines 928 configuration information as setting the selected channels to be unblocked.

The upload strategy server 114 further obtains 930 blocking time duration for the old channels among the unselected channels. The upload strategy server 114 ranks 932 the old channels based on the blocking time duration and selects 934 a number of old channels based on the ranking. The upload strategy server 114 determines 936 configuration information as setting the selected old channels to be unblocked.

Figure 10:
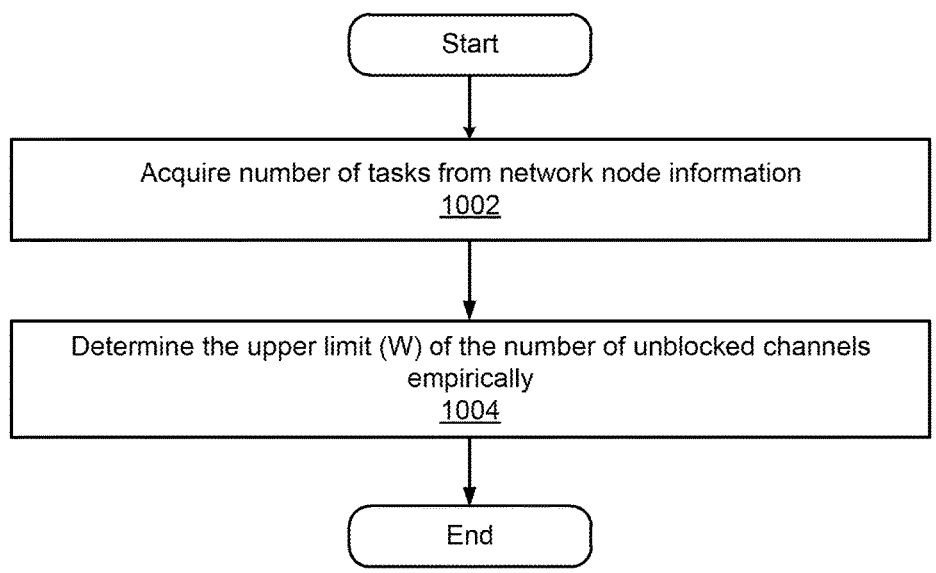
FIG. 10 is a flowchart illustrating a process for determining an upper limit of the number of unblocked channels according to various embodiments.

Referring back to FIG. 9A, the upload strategy server 114 determines an upper limit (e.g., represented by parameter "W") of the number of unblocked channels at step 906. According to various embodiments of the present disclosure, as illustrated in FIG. 10, the upload strategy server 114 determines the upper limit of the number of unblocked channels empirically. The upload strategy server 114 obtains 1002 a number of tasks from the network node information of the client device 101 and determines 1004 the upper limit of the number of unblocked channels empirically.

Figure 11:
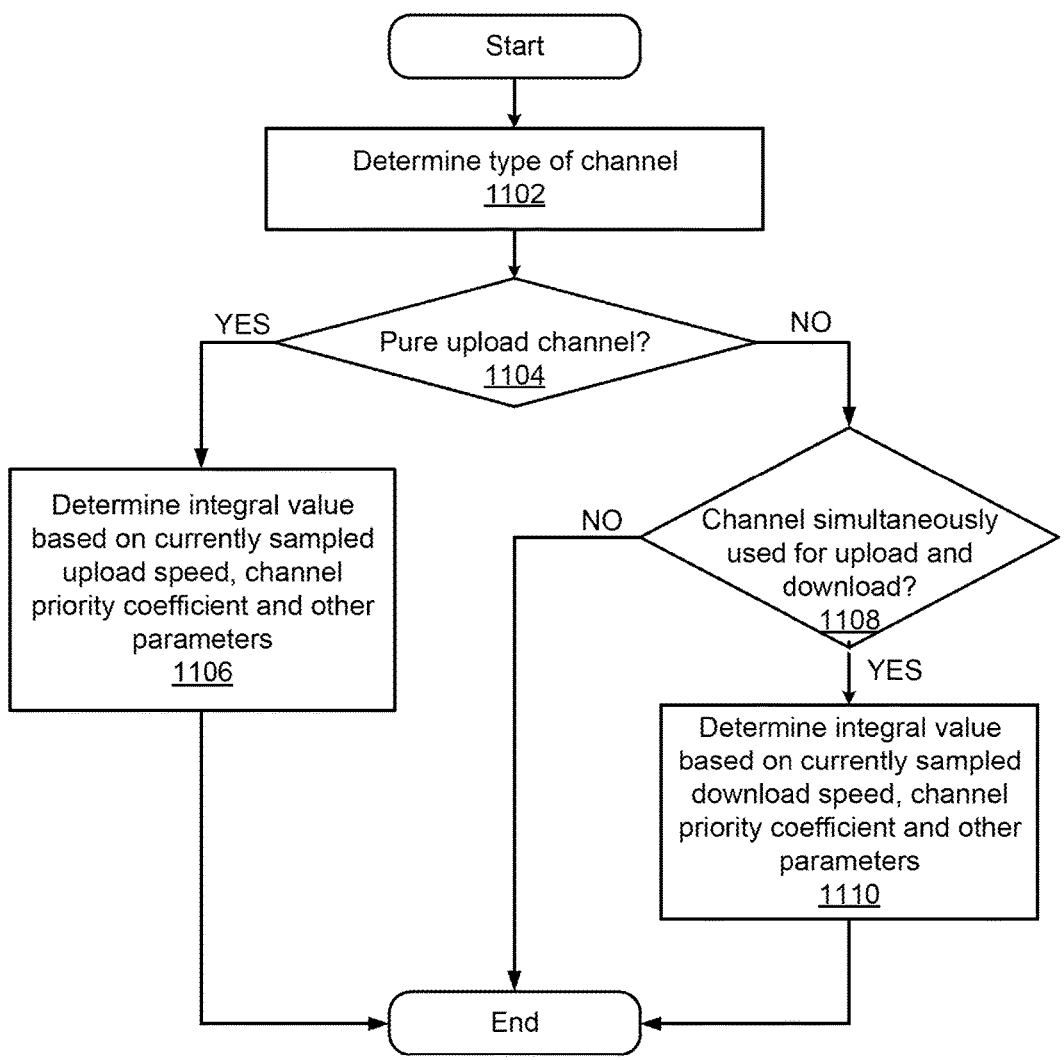
FIG. 11 is a flowchart illustrating a process for determining integral values of channels according to various embodiments.

FIG. 11 is a flowchart illustrating a process for determining integral values of channels according to various embodiments of the present disclosure. Initially, the upload strategy server 114 determines 1102 the type of a channel. Responsive to the type of the channel being a pure upload channel 1104, the upload strategy server 114 determines 1006 the integral value based on currently sampled upload speed, channel priority coefficient and other parameters. Responsive to the type of the upload channel not being a pure upload channel, the upload strategy server 114 checks 1108 whether the channel is simultaneously used for upload and download. If the channel is simultaneously used for both upload and download, the upload strategy server 114 determines 1110 the integral value based on the currently sampled download speed, channel priority coefficients and other parameters; otherwise, the upload strategy server 114 terminates the process.

Figure 12A:
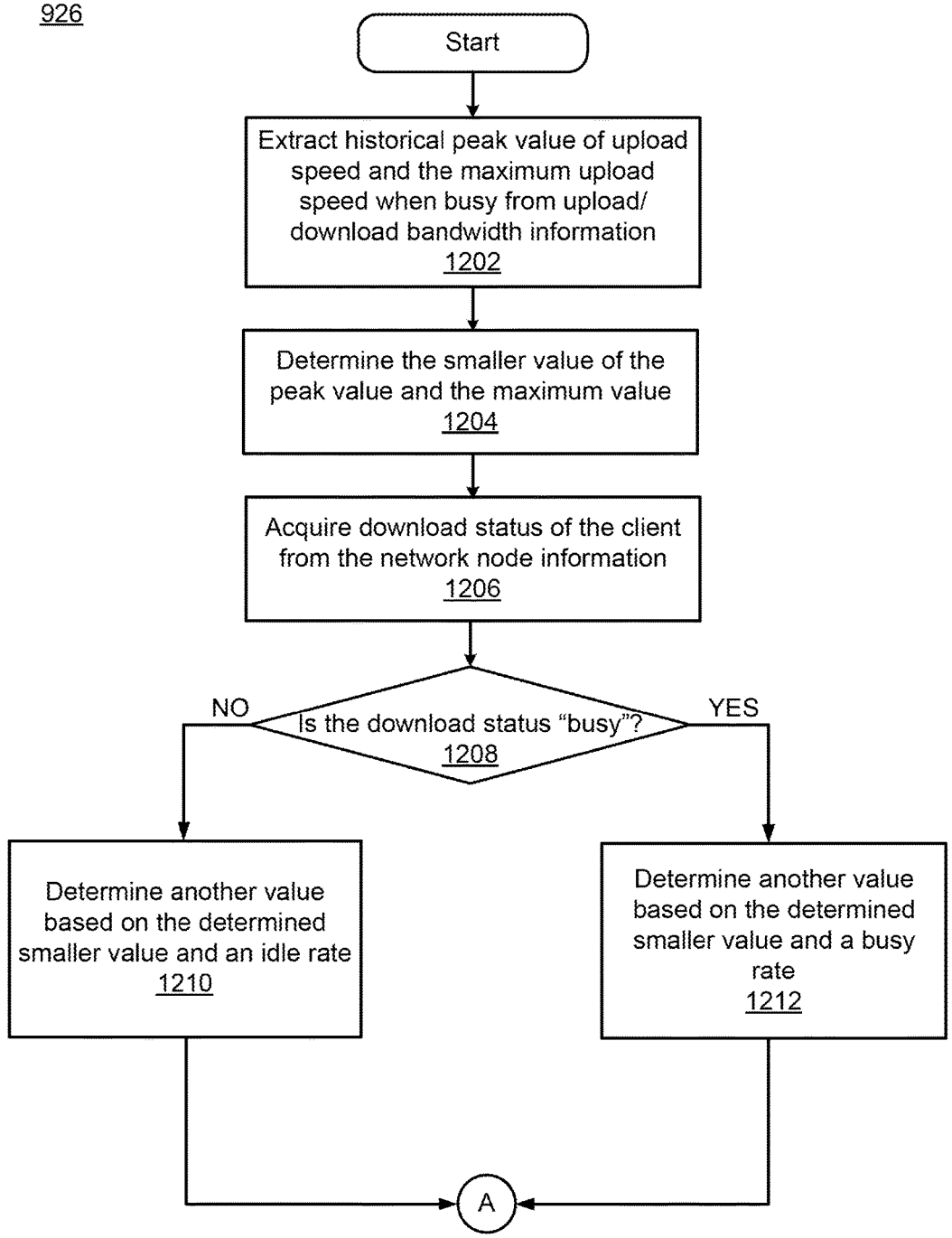
FIGS. 12A-12B is a flowchart illustrating a process for selecting a certain number of top-ranked channels based on integral values according to various embodiments.
Figure 12B:
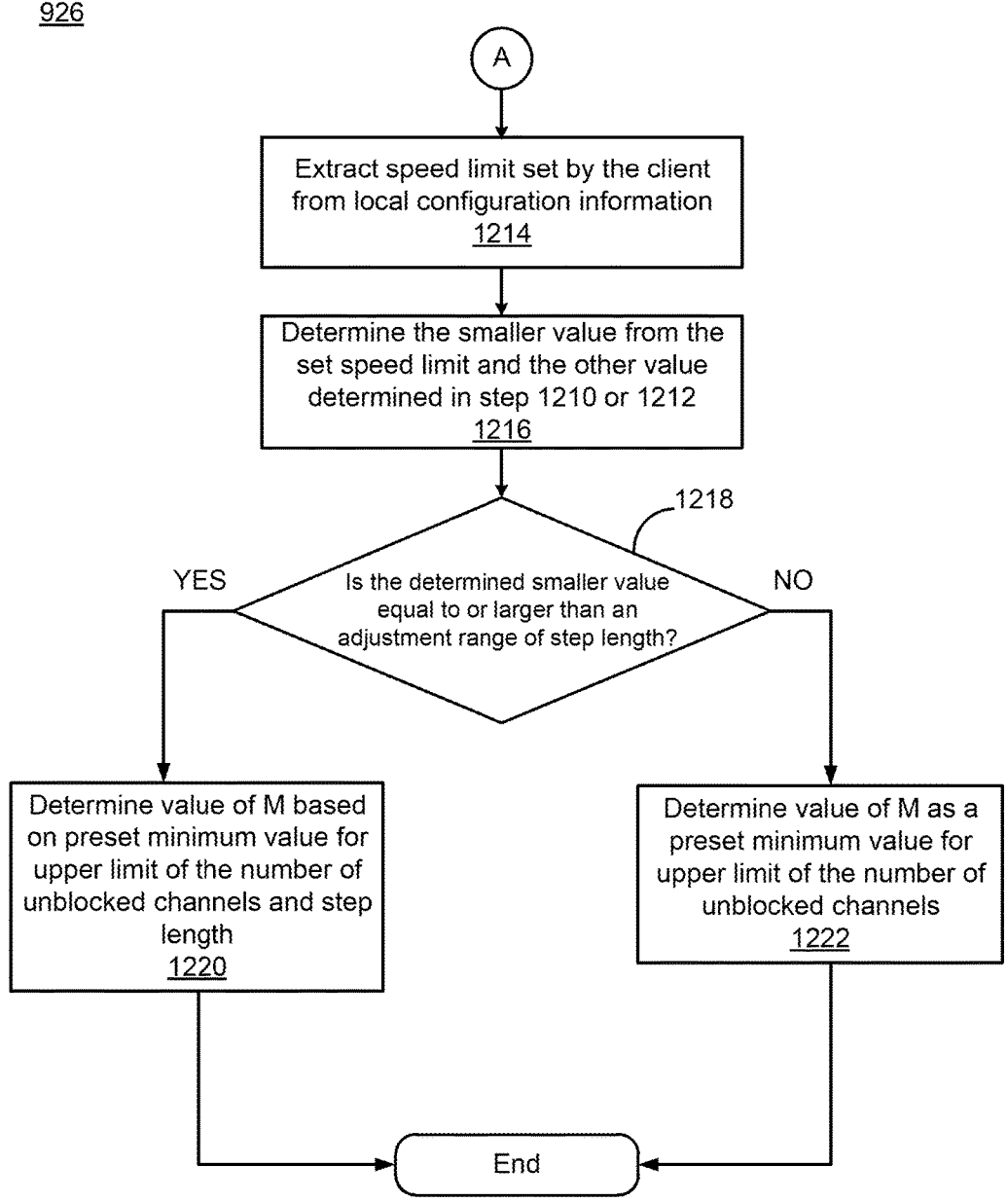

FIG. 12A and FIG. 12B illustrate a process for selecting a certain number of top old channels from a ranking based on integral values according to various embodiments of the present disclosure. FIG. 12A is a flowchart illustrating the first part of the process. FIG. 12B is a flowchart illustrating the second part of the process.

Initially, the upload strategy server 114 extracts 1202 from upload/download bandwidth information a historical peak value of upload speed and maximum upload speed for a client device 101 being in "busy" status for upload or download. The upload strategy server 114 determines 1204 the smaller value of the peak value and the maximum value. The upload strategy server 114 obtains 1206 download status of the client device 101 from the network node information of the client device 101. Responsive to the download status not being "busy," the upload strategy server 114 determines 1210 another value based on the smaller value of the peak value and the maximum value and an idle rate. Responsive to the download status being "busy," the upload strategy server 114 determines 1212 another value based on the smaller value of the peak value and the maximum value and a busy rate.

Following the process illustrated in FIG. 12A, the upload strategy server 114 extracts 1214 network speed limit set by the client device 101 from the local configuration information of the client device 101, and determines 1216 the smaller value from the speed limit and the other value determined in either step 1210 or step 1212. The upload strategy server 114 determines 1218 whether the determined smaller value is equal to or greater than an adjustment range of step length. Responsive to the determined smaller value being equal to or greater than the adjustment range, the upload strategy server 114 determines 1220 the number of selected old channels (e.g., the top M channels selected at step 926 illustrated in FIG. 9B) based on a preset minimum value for the upper limit of the number of unblocked channels and step length. Responsive to the determined smaller value not being equal to or greater than the adjustment range, the upload strategy server 114 determines 1222 the number of selected old channels as a preset minimum value for the upper limit of the number of unblocked channels.

Figure 13:
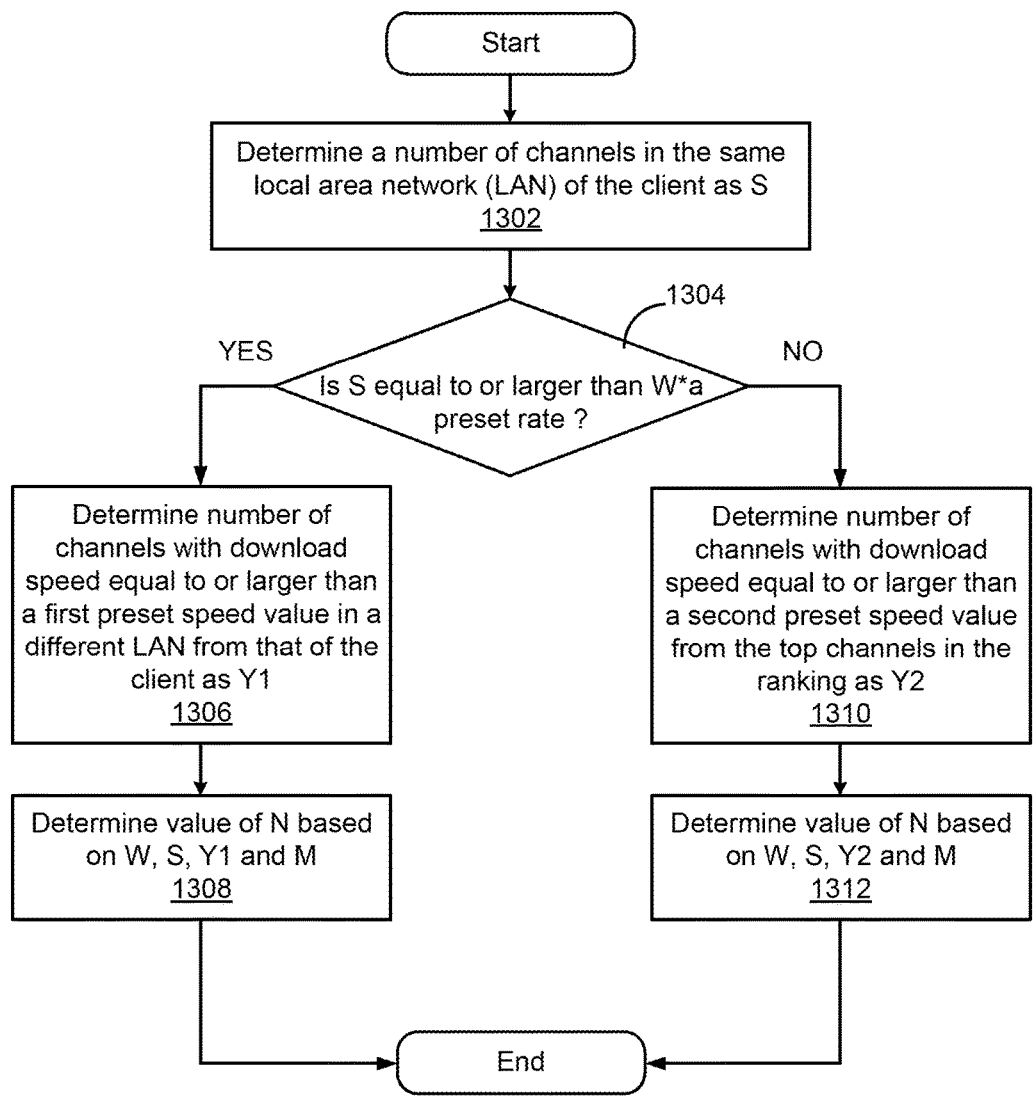
FIG. 13 is a flowchart illustrating a process for selecting a certain number of top-ranked old channels, based on blocking time durations of the channels according to various embodiments.

FIG. 13 is a flowchart illustrating a process for selecting a number of top old channels from a ranking based on blocking time durations of the channels according to various embodiments of the present disclosure. The upload strategy server 114 determines 1302 a number of channels in the same LAN of the client device 101 and represents the determined number of channels by parameter "S." The upload strategy server 114 checks 1304 whether the number of channels (i.e., parameter "S") is equal to or greater than a threshold value, W×a preset rate.

Responsive to the number of channels being equal to or greater than the threshold value, the upload strategy server 114 determines 1306 the number of channels with download speed equal to or greater than a first preset speed value in a different LAN from that of the client device 101 and represents the number of channels by parameter "Y1." The upload strategy server 114 determines 1308 the value of N based a function of parameters W, S, Y1 and M.

Responsive to the number of channels not being equal to or greater than the threshold value, the upload strategy server 114 determines 1310 the number of channels with download speed equal to or greater than a second preset speed value from the top channels in the ranking and represents the number of channels by parameter "Y2." The upload strategy server 114 determines 1312 the value of N based a function of parameters W, S, Y2 and M.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Further, it has also proven convenient at times to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Various embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the disclosure. The scope of the disclosure is to be limited only by the following claims. From the above discussion, many variations will be apparent to one skilled in the relevant art that would yet be encompassed by the spirit and scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules.

Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A computer-implemented method for determining upload configuration for a client acting as a peer-to-peer source of data, the method comprising:
    receiving client information relating to uploads from the client;
    determining upload configuration information based on the client information;
    providing the determined upload configuration information to the client, wherein uploads from the client are provided according to the upload configuration information;
    wherein determining the upload configuration information based on the client information comprises:
        detecting a plurality of old upload channels in a local area network (LAN) different from that of the client,
        determining a priority value for each of the plurality of old upload channels,
        ranking the plurality of old upload channels based on the priority value for each of the plurality of old upload channels,
        selecting a number of top-ranked old upload channels, and
        determining the upload configuration information as setting the selected old upload channels to be unblocked, so that the selected old upload channels can be found by the client; and
    wherein the client information includes a download status of the client and whether an upload speed limit has been set for the client, and determining the upload configuration information based on the client information further comprises:
        extracting a historical peak value of upload speed for the client,
        detecting whether the download status of the client is busy, and
        in response to the detection that the download status of the client is busy:
            extracting a historical maximum value of upload speed for the client, when the download status of the client was busy,
            determining a crest value as the historical maximum value of upload speed when the download status of the client was busy,
            determining a trough value by multiplying the historical peak value of upload speed and a busy rate, the busy rate indicating how much the download status of the client is busy, and
            determining a range of upload speed limits between the crest value and the trough value, wherein the upload speed limit for the client is alternately set at the crest value and at the trough value.

2. The method of claim 1, further comprising:
    receiving a request to provide uploads from the client, the request including the client information relating to uploads from the client, and
    wherein the determined upload configuration information is provided in response to the received request.

3. The method of claim 1, wherein the client information comprises local configuration information describing the client's current configuration for providing uploads.

4. The method of claim 3, wherein the upload configuration information comprises an update of the local configuration information.

5. The method of claim 4, wherein the update of the local configuration information includes an upload speed limit for uploads from the client.

6. The method of claim 4, wherein the update of the local configuration information includes blocking/non-blocking information determining a number of upload channels from the client.

7. The method of claim 3, wherein the client information further comprises network node information describing connections of the client as a network node and bandwidth information describing upload or download bandwidth of the client.

8. The method of claim 1, wherein the client information includes an upload speed limit for the client, and determining the upload configuration information comprises:
   detecting whether the upload speed limit is more than a preset minimum speed value; and
   responsive to said detection, generating upload configuration information that does not update the upload speed limit.

9. The method of claim 1, wherein the client information includes a download status of the client and whether an upload speed limit has been set for the client, and determining upload configuration information comprises:
   detecting whether the client has no set upload speed limit and whether the download status of the client is idle; and
   responsive to said detections:
   extracting a historical peak value of upload speed for the client; and
   determining an upload speed limit for the client by multiplying the historical peak value of upload speed by an idle rate, the idle rate indicating how much the download status of the client is idle, the upload configuration information including the determined upload speed limit.

10. The method of claim 1, wherein the client information includes information relating to network channels from the client, and the upload configuration information relates to blocking/non-blocking of upload channels from the client.

11. The method of claim 1, wherein determining upload configuration information based on the client information comprises:
   determining an upper limit for a number of unblocked upload channels from the client, based on the client information;
   determining a number of new upload channels, based on the client information;
   responsive to a determination that the number of new upload channels is greater than or equal to a product of the upper limit and a preset rate, wherein the preset rate is determined empirically, determining the upload configuration information as setting one or more old upload channels in a different Intranet from that of the client to be unblocked, wherein the one or more old upload channels have download speed greater than or equal to a first preset speed.

12. The method of claim 11, wherein determining the upper limit for the number of unblocked upload channels, based on the client information, comprises:
   acquiring a number of tasks based on the client information; and
   determining the upper limit for the number of unblocked upload channels as $\min\{A1, \max[A2, \text{the number of tasks} \times A3]\}$, wherein A1 represents an empirical value of the upper limit, A2 represents an empirical value of a lower limit for the number of upload channels and A3 represents an empirical value of a multiplying power of the number of tasks.

13. The method of claim 1, wherein determining upload configuration information based on the client information comprises:
   determining an upper limit for a number of unblocked upload channels, based on the client information; and
   determining a number of new upload channels, based on the client information;
   responsive to a determination that the number of new upload channels is less than a product of the upper limit and a preset rate, wherein the preset rate is determined empirically,
   ranking one or more old upload channels in a different Intranet from that of the client, the ranking based on their download speeds;
   selecting a number of top-ranked old upload channels, wherein the selected old upload channels have download speeds greater than or equal to a second preset speed, and the number selected is a product of the upper limit and a second preset rate, wherein the second preset rate is determined empirically; and
   determining the upload configuration information as setting the selected old upload channels to be unblocked.

14. A client device for acting as a peer-to-peer source of data, the client device comprising:
   a computer processor for executing computer executable instructions; and
   a non-transitory computer readable storage device storing the computer executable instructions to perform steps comprising:
   collecting client information relating to uploads from the client;
   sending the client information to a server;
   receiving upload configuration information from the server,
   wherein the upload configuration information is based on the client information, the server detects a plurality of old upload channels in a local area network (LAN) different from that of the client device, determines a priority value for each of the plurality of old upload channels, ranks the plurality of old upload channels based on the priority value for each of the plurality of old upload channels, selects a number of top-ranked old upload channels; and determines the upload configuration information as setting the selected old upload channels to be unblocked, so that the selected old upload channels can be found by the client, and
   wherein the client information includes a download status of the client and whether an upload speed limit has been set for the client,
   the server extracts a historical peak value of upload speed for the client,
   the server detects whether the download status of the client is busy, and
   in response to the server's detection that the download status of the client is busy:

the server extracts a historical maximum value of upload speed for the client, when the download status of the client was busy, the server determines a crest value as the historical maximum value of upload speed when the download status of the client was busy, the server determines a trough value by multiplying the historical peak value of upload speed and a busy rate, the busy rate indicating how much the download status of the client is busy, and the server determines a range of upload speed limits between the crest value and the trough value, wherein the upload speed limit for the client is alternately set at the crest value and at the trough value; and adjusting an upload configuration for the client based on the received upload configuration information.

15. The client device of claim 14, wherein adjusting the upload configuration comprises adjusting an upload bandwidth based on the upload configuration information.

16. The client device of claim 14, wherein adjusting the upload configuration comprises adjusting an upload speed limit based on the upload configuration information.

17. The client device of claim 14, wherein adjusting the upload configuration comprises adjusting blocking/non-blocking status for upload channels from the client device.

* * * * *